United States Patent
Kurzynski et al.

(10) Patent No.: US 11,812,117 B2
(45) Date of Patent: Nov. 7, 2023

(54) RECONCILIATION OF COMMERCIAL MEASUREMENT RATINGS

(71) Applicant: The Nielsen Company (US), LLC, New York, NY (US)

(72) Inventors: David J. Kurzynski, South Elgin, IL (US); Samantha M. Mowrer, San Francisco, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/214,595

(22) Filed: Mar. 26, 2021

(65) Prior Publication Data
US 2021/0258654 A1    Aug. 19, 2021

Related U.S. Application Data

(63) Continuation of application No. PCT/US2021/017858, filed on Feb. 12, 2021.

(60) Provisional application No. 62/976,938, filed on Feb. 14, 2020.

(51) Int. Cl.
*H04N 21/81*    (2011.01)

(52) U.S. Cl.
CPC ................. *H04N 21/812* (2013.01)

(58) Field of Classification Search
CPC ................. H04N 21/812; H04N 21/2407
See application file for complete search history.

(56) References Cited

U.S. PATENT DOCUMENTS

| | | |
|---|---|---|
| 2009/0187932 A1 | 7/2009 | Rathburn et al. |
| 2011/0288907 A1* | 11/2011 | Harvey .............. G06Q 10/0639 705/7.29 |
| 2017/0302997 A1 | 10/2017 | Brown |
| 2019/0261060 A1 | 8/2019 | Liassides et al. |

FOREIGN PATENT DOCUMENTS

WO    2018234548    12/2018

OTHER PUBLICATIONS

International Searching Authority, "International Search Report and Written Opinion," issued in connection with International Patent Application No. PCT/US2021/017858, dated Jun. 7, 2021, 9 pages.

* cited by examiner

*Primary Examiner* — Chenea Davis

(57) ABSTRACT

An example apparatus includes an advertisement determiner to identify a first plurality of respondents that received an addressable advertisement and a second plurality of respondents that received a linear advertisement based on combined program tuning data and reference advertisement data; a calculator to calculate a first average commercial minute rating for the addressable advertisement based on first duration weighted impressions associated with the first plurality of respondents and a second average commercial minute rating for the linear advertisement based on second duration weighted impressions associated with the second plurality of respondents; and a communication interface to transmit the first average commercial minute rating and the second average commercial minute rating for crediting the addressable advertisement and the linear advertisement with audience viewership metrics.

20 Claims, 17 Drawing Sheets

| TELECAST DATE | PROGRAM | NETWORK | SOURCE | C3 IMPRESSIONS (HH) | UNIVERSE ESTIMATE (HH) | C3 RATING (HH) |
|---|---|---|---|---|---|---|
| 10/13 | NEWSROOM TODAY | CNN | NATIONAL PANEL | 720,559 | 120,600,000 | 0.60 |
| 10/13 | NEWSROOM TODAY | CNN | PANEL + SMART TV (LG) | 713,353 | 120,600,000 | 0.59 |
| 10/13 | NEWSROOM TODAY | CNN | SMART TV (LG) | 18,312 | 3,158,831 | 0.58 |

FIG. 4A

| SMART TV UNIVERSE | TARGET IMPRESSIONS | TARGET HOUSEHOLDS | REPORTABLE IMPRESSIONS |
|---|---|---|---|
| 3,158,831 | 5,000 | | 4,225 |

| | MINUTE OF PGM (512) | BRAND (514) | MINUTE LEVEL IMPRESSION PANEL + SMART TV (516) | ADDRESSABLE IMPRESSIONS (518) | REMAINDER LINEAR IMPRESSIONS (520) |
|---|---|---|---|---|---|
| 502 | 37 | NATIONAL CAR RENTAL RENTAL CAR SVCS | 726,517 | 825 | 725,692 |
| 504 | 38 | IHOP RESTAURANT | 709,136 | 910 | 708,226 |
| 506 | 39 | DANGOTE MANUFACTURERS-GENERAL | 699,878 | 824 | 699,054 |
| 508 | 40 | ENSURE ORIGINAL NUTRITIONAL SUPPLMT | 693,354 | 834 | 692,520 |
| 510 | 41 | NETSUITE COMPUTER SOFTWARE | 700,982 | 832 | 700,150 |
| | | TOTAL (522) | 3,529,857 | 4,225 | 3,525,642 |

FIG. 5B

| TELECAST DATE (532) | PROGRAM (534) | NETWORK (536) | PRIOR C3 IMPRESSION (NATIONAL TV PANEL) (HH) (538) | NEW C3 IMPRESSION (PANEL+SMART TV/ MVPD) (HH) (540) | RECONCILED C3 IMPRESSION (PANEL+SMART TV/ MVPD) (HH) (542) | DELTA (NEW C3-RECONCILED C3) (544) |
|---|---|---|---|---|---|---|
| 10/13 | NEWSROOM TODAY | CNN | 720,559 | 713,353 | 713,158 | 195 |

| PROGRAM NAME — 602 | TELECAST START TIME — 604 | MINUTE OF PROGRAM — 606 | COMMERCIAL DURATION — 608 | IMPRESSIONS — 610 | DURATION WEIGHTED IMPRESSIONS — 612 |
|---|---|---|---|---|---|
| EXAMPLE GRATIA | 8:00 PM | 1 | 0 | 25,552 | |
| EXAMPLE GRATIA | 8:00 PM | 2 | 0 | 27,031 | |
| EXAMPLE GRATIA | 8:00 PM | 3 | 0 | 27,031 | |
| EXAMPLE GRATIA | 8:00 PM | 4 | 24 | 25,034 | 600,816 |
| EXAMPLE GRATIA | 8:00 PM | 5 | 60 | 21,014 | 1,260,840 |
| EXAMPLE GRATIA | 8:00 PM | 6 | 50 | 18,753 | 937,650 |
| EXAMPLE GRATIA | 8:00 PM | 7 | 0 | 19,843 | |
| EXAMPLE GRATIA | 8:00 PM | 8 | 0 | 22,654 | |
| EXAMPLE GRATIA | 8:00 PM | 9 | 0 | 25,511 | |
| EXAMPLE GRATIA | 8:00 PM | 10 | 0 | 25,002 | |

FIG. 6

| PROGRAM NAME | TELECAST START TIME | MINUTE OF PROGRAM | COMMERCIAL DURATION | IMPRESSIONS | DURATION WEIGHTED IMPRESSIONS |
|---|---|---|---|---|---|
| EXEMPLI GRATIA | 8:00PM | 4 | 24 | 25,034 | 600,816 |
| EXEMPLI GRATIA | 8:00PM | 5 | 60 | 14,716 | 882,960 |
| EXEMPLI GRATIA | 8:00PM | 5 | 60 | 6,298 | 377,880 |
| EXEMPLI GRATIA | 8:00PM | 6 | 50 | 18,753 | 937,650 |

FIG. 7

| PROGRAM NAME — 802 | TELECAST START TIME — 804 | MINUTE OF PROGRAM — 806 | COMMERCIAL DURATION — 808 | IMPRESSIONS — 810 | DURATION WEIGHTED IMPRESSIONS — 812 |
|---|---|---|---|---|---|
| EXEMPLI GRATIA | 8:00PM | 4 | 24 | 25,034 | 600,816 |
| EXEMPLI GRATIA | 8:00PM | 5 | 60 | 6,612 | 396,720 |
| EXEMPLI GRATIA | 8:00PM | 5 | 60 | 6,298 | 377,880 |
| EXEMPLI GRATIA | 8:00PM | 5 | 60 | 5,492 | 329,520 |
| EXEMPLI GRATIA | 8:00PM | 5 | 60 | 2,612 | 156,720 |
| EXEMPLI GRATIA | 8:00PM | 6 | 50 | 5,492 | 274,600 |
| EXEMPLI GRATIA | 8:00PM | 6 | 50 | 2,612 | 130,600 |
| EXEMPLI GRATIA | 8:00PM | 6 | 50 | 10,649 | 532,450 |

Row labels: 814, 816, 818, 820, 822, 824, 826

FIG. 8

| PROGRAM NAME | TELECAST START TIME | MINUTE OF PROGRAM | COMMERCIAL DURATION | IMPRESSIONS | DURATION WEIGHTED IMPRESSIONS |
|---|---|---|---|---|---|
| EXEMPLI GRATIA | 8:00PM | 4 | 24 | 25,034 | 600,616 |
| EXEMPLI GRATIA | 8:00PM | 5 | 60 | 6,612 | 396,720 |
| EXEMPLI GRATIA | 8:00PM | 5 | 60 | 6,298 | 377,880 |
| EXEMPLI GRATIA | 8:00PM | 5 | 60 | 5,492 | 329,620 |
| EXEMPLI GRATIA | 8:00PM | 5 | 60 | 2,612 | 156,720 |
| EXEMPLI GRATIA | 8:00PM | 6 | 50 | 18,753 | 937,650 |

- Row 2: EXPOSED TO 45 SECONDS LINEAR ADS, 15 SECONDS AD X
- Row 3: EXPOSED TO LINEAR ADS ONLY
- Row 4: EXPOSED TO 40 SECONDS LINEAR ADS, 20 SECONDS AD Y
- Row 5: EXPOSED TO 25 SECONDS LINEAR ADS, 35 SECONDS ADS X AND Y

FIG. 9

| MINUTE OF PROGRAM | COMMERCIAL DURATION | IMPRESSIONS |
|---|---|---|
| 4 | 24 | 25,034 |
| 5 | 60 | 6,612 |
| 5 | 60 | 6,298 |
| 5 | 60 | 5,492 |
| 5 | 60 | 2,612 |
| 6 | 50 | 18,753 |

EXAMPLE RESPONDENTS FOR MINUTE 5

| RESPONDENT | RESPONDENT WEIGHT | MINUTE OF PROGRAM | LINEAR DURATION | ADDRESSABLE DURATION | DURATION WDT LINEAR IMPRESSIONS | DURATION WDT ADDRESABLE IMPRESSIONS |
|---|---|---|---|---|---|---|
| 1 | 2,261 | 5 | 60 | 0 | 135,660 | 0 |
| 2 | 4,351 | 5 | 60 | 0 | 261,060 | 0 |
| 3 | 2,847 | 5 | 45 | 15 | 128,115 | 42,705 |
| 4 | 3,451 | 5 | 45 | 15 | 155,295 | 51,765 |
| 5 | 2,467 | 5 | 40 | 20 | 96,680 | 49,340 |
| 6 | 3,025 | 5 | 40 | 20 | 121,000 | 60,500 |
| 7 | 2,612 | 5 | 25 | 35 | 65,300 | 91,420 |

AVERAGE ACROSS TOTAL COMMERCIAL SECONDS IN MINUTE

| MINUTE OF PROGRAM | TOTAL SUMS OF WEIGHTS | TOTAL COMMERCIAL DURATION | DURATION WTD LINEAR IMPRESSIONS | DURATION WTD ADDRESSABLE IMPRESSIONS | LINEAR COMMERCIAL MINUTE RATING | ADDRESSABLE COMMERCIAL MINUTE RATING |
|---|---|---|---|---|---|---|
| 4 | 25,034 | 24 | 600,816 | 0 | 25,034 | 0 |
| 5 | 21,014 | 60 | 965,110 | 295,730 | 16,085 | 4,929 |
| 6 | 18,753 | 50 | 937,650 | 0 | 18,753 | 0 |

| MINUTE OF PROGRAM | COMMERCIAL DURATION | IMPRESSIONS |
|---|---|---|
| 4 | 24 | 25,034 |
| 5 | 60 | 6,612 |
| 5 | 60 | 6,298 |
| 5 | 60 | 5,492 |
| 5 | 60 | 2,612 |
| 6 | 50 | 18,753 |

| TELECAST DATE | ORIGIN-ATOR | PROGRAM NAME | EPISODE TITLE | START TIME | END TIME | DEMO | UNIVERSE ESTIMATE | C3 CURRENCY | | C3 – PANEL + ACR | | TARGETED IMPRESSIONS | RECONCILED C3 | |
|---|---|---|---|---|---|---|---|---|---|---|---|---|---|---|
| | | | | | | | | AA% | AA PROJECTION | AA% | AA PROJECTION | AA PROJECTION | AA% | AA PROJECTION |
| 10/22 | NET | PROGRAM 1 | S4:E5 | 8:00PM | 9:00PM | HH | 120,600,000 | 2.9 | 3,497,400 | 3.0 | 3,618,000 | 120,600 | 2.9 | 3,497,400 |
| 10/22 | NET | PROGRAM 1 | S4:E5 | 8:00PM | 9:00PM | P25-54 | 121,160,000 | 3.2 | 3,877,120 | 3.1 | 3,755,960 | 121,160 | 3.0 | 3,634,800 |
| 10/22 | NET | PROGRAM 2 | S2:E5 | 9:00PM | 10:00PM | HH | 120,600,000 | 2.4 | 2,894,400 | 2.5 | 3,015,000 | 120,600 | 2.4 | 2,894,400 |
| 10/22 | NET | PROGRAM 2 | S2:E5 | 9:00PM | 10:00PM | P25-54 | 121,160,000 | 2.6 | 3,150,160 | 2.7 | 3,271,320 | 121,160 | 2.6 | 3,150,160 |

FIG. 14A

| TELECAST DATE | ORIGIN-ATOR | PROGRAM NAME | EPISODE TITLE | START TIME | END TIME | MDP | DEMO | UNIVERSE ESTIMATE | CURRENCY | | PANEL+ACR | | TARGETED IMPRESSIONS | RECONCILED AA | |
|---|---|---|---|---|---|---|---|---|---|---|---|---|---|---|---|
| | | | | | | | | | AA% | AA PROJECTION | AA% | AA PROJECTION | AA PROJECTION | AA% | AA PROJECTION |
| 10/22 | NET | PROGRAM 1 | S4:E5 | 8:00PM | 9:00PM | 3 | HH | 120,600,000 | 2.9 | 3,497,400 | 3.0 | 3,618,000 | 506,520 | 2.6 | 3,111,480 |
| 10/23 | NET | PROGRAM 1 | S4:E5 | 9:00PM | 10:00PM | 4 | HH | 120,600,000 | 2.8 | 3,376,800 | 2.9 | 3,497,400 | 489,636 | 2.5 | 3,007,754 |
| 10/24 | NET | PROGRAM 1 | S4:E5 | 10:00PM | 11:00PM | 5 | HH | 120,600,000 | 2.8 | 3,376,800 | 2.9 | 3,497,400 | 489,636 | 2.5 | 3,007,754 |
| 10/25 | NET | PROGRAM 1 | S4:E5 | 11:00PM | 12:00AM | 6 | HH | 120,600,000 | 2.7 | 3,256,200 | 2.8 | 3,375,800 | 472,752 | 2.4 | 2,904,048 |
| 10/26 | NET | PROGRAM 1 | S4:E5 | 12:00AM | 1:00AM | 12 | HH | 120,600,000 | 2.8 | 3,375,800 | 2.7 | 3,256,200 | 455,868 | 2.3 | 2,800,332 |
| 10/27 | NET | PROGRAM 1 | S4:E5 | 1:00AM | 2:00AM | 13 | HH | 120,600,000 | 2.7 | 3,256,200 | 2.7 | 3,256,200 | 438,984 | 2.3 | 2,800,332 |
| 10/28 | NET | PROGRAM 1 | S4:E5 | 2:00AM | 3:00AM | 14 | HH | 120,600,000 | 2.7 | 3,135,600 | 2.6 | 3,135,600 | 438,984 | 2.2 | 2,696,616 |
| 10/29 | NET | PROGRAM 1 | S4:E5 | 3:00AM | 4:00AM | 15 | HH | 120,600,000 | 2.6 | 3,497,400 | 2.6 | 3,135,600 | 438,984 | 2.2 | 2,696,616 |
| 10/30 | NET | PROGRAM 1 | S4:E5 | 4:00AM | 5:00AM | 21 | HH | 120,600,000 | 2.9 | 3,497,400 | 2.9 | 3,497,400 | 489,636 | 2.5 | 3,007,754 |
| 10/31 | NET | PROGRAM 1 | S4:E5 | 5:00AM | 6:00AM | 22 | HH | 120,600,000 | 2.8 | 3,376,800 | 2.9 | 3,497,400 | 489,636 | 2.5 | 3,007,754 |
| 11/1 | NET | PROGRAM 1 | S4:E5 | 6:00AM | 7:00AM | 23 | HH | 120,600,000 | 2.8 | 3,376,800 | 2.8 | 3,376,800 | 472,752 | 2.4 | 2,904,048 |

FIG. 14B

RECONCILIATION OF COMMERCIAL MEASUREMENT RATINGS

RELATED APPLICATION

This application is a continuation of International Application No. PCT/US21/17858, filed on Feb. 12, 2021, and titled "RECONCILIATION OF COMMERCIAL MEASUREMENT RATINGS," which claims the benefit of U.S. Provisional Patent Application No. 62/976,938, filed on Feb. 14, 2020, and titled "RECONCILIATION OF COMMERCIAL MEASUREMENT RATINGS," both of which are hereby incorporated herein by reference in their entireties. Priority to International Application No. PCT/US21/17858 and U.S. Provisional Patent Application No. 62/976,938 is claimed.

FIELD OF THE DISCLOSURE

This disclosure relates generally to audience measurement and, more particularly, to the reconciliation of commercial measurement ratings.

BACKGROUND

Audience measurement entities (AMEs), such as The Nielsen Company (US), LLC, may extrapolate audience viewership data for a total television viewing audience. The audience viewership data collected by an AME may include viewership data for advertisements broadcasted during television programs.

BRIEF DESCRIPTION OF THE DRAWINGS

FIGS. 4A, 4B illustrate example results of an example database interface included in the example C3-C7 calculator of FIG. 2 to combine panel data and Smart TV data to identify an addressable audience.

FIGS. 5A, 5B illustrate example results of recalculating minute-level audience data and reconciling a C3-C7 metric.

FIG. 6 illustrates an example ACM report based on duration weighted impressions during the commercial minutes of a telecast without accounting for linear advertisements and addressable advertisements.

FIG. 7 illustrates an example ACM report after an addressable advertisement insertion.

FIG. 8 illustrates an example ACM report with different addressable advertisements during different telecast minutes.

FIG. 9 illustrates example viewership for a linear advertisement and an addressable advertisement over different telecast minutes.

FIG. 11 illustrates an example output of an example duration weighted impressions calculator included in the example C3-C7 calculator of FIG. 2.

FIG. 13 illustrates an example output of an example commercial minute ratings calculator included in the example C3-C7 calculator of FIG. 2.

FIGS. 14A, 14B illustrate example ACM reports from an example ad ratings determiner of FIG. 1.

Figure 1:
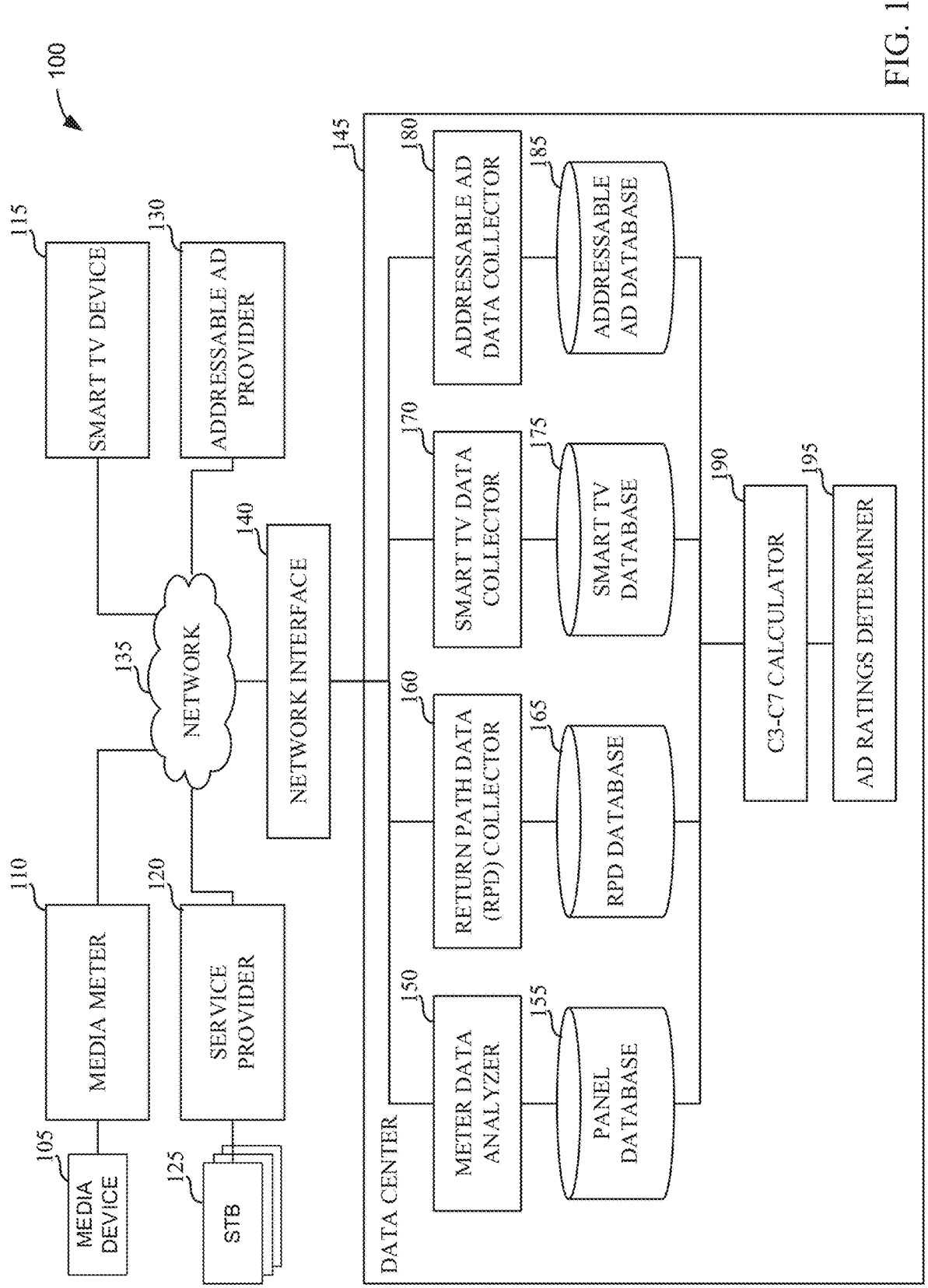
FIG. 1 is a block diagram of an example environment in which the teachings of this disclosure may be implemented.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

As used herein, the term "media" includes any type of content and/or advertisement delivered via any type of distribution medium. Thus, media includes television programming or advertisements, radio programming or advertisements, movies, web sites, streaming media, etc. As used herein, the term "media asset" refers to any individual, collection, or portion/piece of media of interest. For example, a media asset may be a television show episode, a movie, a clip, etc. Media assets can be identified via unique media identifiers (e.g., a name of the media asset, a metadata tag, etc.). Media assets can be presented by any type of media presentation method (e.g., via streaming, via live broadcast, from a physical medium, etc.).

Example methods, apparatus, and articles of manufacture disclosed herein monitor media presentations by media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

In some examples, AMEs aggregate media monitoring information to determine ownership and/or usage statistics of media devices, determine the media presented by the media devices, determine audience ratings, determine relative rankings of usage and/or ownership of media devices, determine types of uses of media devices (e.g., whether a device is used for browsing the Internet, streaming media from the Internet, etc.), and/or determine other types of media device information. In examples disclosed herein, monitoring information includes, but is not limited to, one or more of media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.), etc.

In some examples, audio watermarking is used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the watermark is embedded in the audio or video component so that the watermark is hidden.

To identify watermarked media, the watermark(s) are extracted and used to access a table of reference watermarks that are mapped to media identifying information. In some examples, media monitoring companies provide watermarks and watermarking devices to media providers with which to encode their media source feeds. In some examples, if a media provider provides multiple media source feeds (e.g., ESPN and ESPN 2, etc.), a media provider can provide a different watermark for each media source feed.

In some examples, signature matching is used to identify media. Unlike media monitoring techniques based on watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the terms "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media source feeds. Various comparison criteria, such as a cross-correlation value, a Hamming distance, etc., can be evaluated to determine whether a monitored signature matches a particular reference signature. When a match between the monitored signature and a reference signature is found, the monitored media can be identified as corresponding to the particular reference media represented by the reference signature that matched with the monitored signature. In some examples, signature matching is based on sequences of signatures such that, when a match between a sequence of monitored signatures and a sequence of reference signatures is found, the monitored media can be identified as corresponding to the particular reference media represented by the sequence of reference signatures that matched the sequence of monitored signatures. Because attributes, such as an identifier of the media, a presentation time, a broadcast channel, etc., are collected for the reference signature(s), these attributes may then be associated with the monitored media whose monitored signature matched the reference signature(s). Example systems for identifying media based on codes and/or signatures are long known and were first disclosed in Thomas, U.S. Pat. No. 5,481,294, which is hereby incorporated by reference in its entirety.

AMEs, such as The Nielsen Company (US), LLC, desire knowledge regarding how users interact with media devices such as smartphones, tablets, laptops, smart televisions, etc. AMEs may also be referred to as media monitoring entities, audience survey entities, etc. In some examples, AMEs monitor media presentations made at the media devices to, among other things, monitor exposure to advertisements, determine advertisement effectiveness, etc. AMEs can provide media meters to people (e.g., panelists) which can generate media monitoring data based on the media exposure of those users. Such media meters can be associated with a specific media device (e.g., a television, a mobile phone, a computer, etc.) and/or a specific person (e.g., a portable meter, etc.).

As noted above, AMEs extrapolate ratings metrics and/or other audience measurement data for a total television viewing audience from a relatively small sample of panelist households, also referred to herein as panel homes. The panel homes may be well studied and are typically chosen to be representative of an audience universe as a whole.

To help supplement panel data, an AME, such as The Nielsen Company (US), LLC, may reach agreements with pay-television provider companies to obtain the television tuning information derived from set top boxes, which is referred to herein, and in the industry, as return path data (RPD). Set-top box (STB) data includes all the data collected by the set-top box. STB data may include, for example, tuning events and/or commands received by the STB (e.g., power on, power off, change channel, change input source, start presenting media, pause the presentation of media, record a presentation of media, volume up/down, etc.). STB data may additionally or alternatively include commands sent to a content provider by the STB (e.g., switch input sources, record a media presentation, delete a recorded media presentation, the time/date a media presentation was started, the time a media presentation was completed, etc.), heartbeat signals, or the like. The set-top box data may additionally or alternatively include a household identification (e.g. a household ID) and/or a STB identification (e.g. a STB ID).

Return path data includes any data receivable at a media service provider (e.g., a such as a cable television service provider, a satellite television service provider, a streaming media service provider, a content provider, etc.) via a return path to the service provider from a media consumer site. As such, return path data includes at least a portion of the set-top box data. Return path data may additionally or alternatively include data from any other consumer device with network access capabilities (e.g., via a cellular network, the internet, other public or private networks, etc.). For example, return path data may include any or all of linear real time data from an STB, guide user data from a guide server, click stream data, key stream data (e.g., any click on the remote—volume, mute, etc.), interactive activity (such as Video On Demand) and any other data (e.g., data from middleware). RPD data can additionally or alternatively be from the network (e.g., via Switched Digital software) and/or any cloud-based data (such as a remote server DVR) from the cloud.

Example methods, apparatus, systems, and articles of manufacture (e.g., physical storage media) disclosed herein implement the reconciliation of commercial measurement ratings, such as the C3-C7 measurement ratings produced by The Nielsen Company (US), LLC. The C3-C7 metric represents the average audience of National commercials within a given program, inclusive of three (C3) or seven (C7) days of time-shifted viewing. The C3-C7 metric provides commercial metrics regarding the average commercial minute (ACM) for broadcasts of linear advertisements during a program. In examples disclosed herein, an ACM is the average number of duration weighted impressions during the commercial minutes of a telecast. In some example, the C3-C7 metric is determined by calculating the duration weighted impressions for each commercial minute of a telecast by multiplying the number of commercial impressions during the program by the duration of the commercials airing in that minute. The C3-C7 metric then sums the duration weighted impression for the entire telecast and sums the commercial duration in seconds. The C3-C7 metric determines the ACM by dividing the total duration weighted impressions by the total commercial duration.

In examples disclosed herein, a linear advertisement is an advertisement scheduled for broadcasting during a specific program to all households tuned to that program. The C3-C7 metric is determined by the AME for the linear broadcasts using tuning data measurements collected from households during the period(s) of time that advertisement(s) was(were) broadcasted during a program.

Although example techniques disclosed herein are described from the perspective of reconciling C3-C7 commercial metrics that are based on an ACM aggregation technique, the disclosed example techniques can be used to reconcile other ratings metrics. For example, the disclosed example techniques could be used to reconcile commercial metrics that are based on an exact commercial minute (ECM) aggregation technique.

However, the development of addressable advertisement insertion technology has changed the way commercial advertisements in telecasts are provided to at least some media devices in households. Households have experienced an increase in the use of smart televisions (Smart TVs) for presenting media. In examples disclosed herein, a Smart TV is a television that is able to connect to a network, such as the internet, and run applications. Smart TVs may also include technology that allows advertisers to push specific advertisements to targeted households. Additionally, addressable advertisement insertion technology can push specific advertisements to targeted households using set-top boxes (e.g., based on information conveyed by RPD from the set-top boxes), etc. In examples disclosed herein, an addressable advertisement is an advertisement that is shown to a specific media device in a household. In examples disclosed herein, a media device selected for an addressable advertisement will not present the linear advertisement originally scheduled for that time period in the program.

To support addressable advertisement insertion technology, examples disclosed herein augment ACM computation for the C3-C7 metric to reconcile the C3-C7 metric to capture viewership of an advertisement accurately. The addressable advertisement insertion technology allows different households to view different advertisements during the same block of time. An example C3-C7 metric may not differentiate between whether a household audience was presented a linear advertisement or an addressable advertisement while watching a program. Disclosed example techniques reconcile the C3-C7 metrics such that they include ACM viewership data for both the linear advertisements and the addressable advertisements presented in households.

Examples disclosed herein reconcile the C3-C7 metric to differentiate the ACM measurements for addressable advertisements and linear advertisements. Examples disclosed herein collect program viewership data from household Smart TVs and integrate the program viewership data into the measurement data collected for a national panel of households. The program viewership data collected from each Smart TV device in each household represents what program each Smart TV device was tuned to. Examples disclosed herein may collect the viewership data using automatic content recognition techniques based on watermarks, fingerprinting, etc. Examples disclosed herein may additionally or alternatively collect viewership data through a television set-top-box and from RPD data. Examples disclosed herein also obtain reference data that indicate which devices were served the linear advertisement during a time for that program broadcast, and which devices were served an addressable advertisement during that same time in the program broadcast. Examples disclosed herein use both the program viewership data collected for the national panel and the reference data indicating which devices presented which advertisement as inputs to the modified C3-C7 metric. Examples disclosed herein weight ACM measurements from individual Smart TV devices, set-top boxes, individuals in households, etc. to determine the C3-C7 metrics for a program such that the C3-C7 distinguish between linear advertisements and addressable advertisements.

Examples disclosed herein may also introduce a potential gap in the C3-C7 metric measurement when including the viewership data from Smart TVs into the measurement. In some examples, this gap accounts for data being collected from Smart TVs in a home but not being collected from other televisions in households with the Smart TVs. In some examples, to avoid understating the audience estimates, an additional weighting step is used to correct for potential bias in households affected by the Smart TV data collection. In some examples, the additional weighting step includes giving panel households that are in the same footprint as the Smart TV households an additional weight (the weight being larger than the weight added to the Smart TV households) that can be applied to the tuning/viewing data from the non-Smart TV devices. Giving additional weight to the viewing data in the panel households that have data collected from all devices allows for closing the gap introduced by using Smart TVs for measurement.

FIG. 1 is a block diagram of an example environment 100 in which the teachings of this disclosure may be implemented. The environment 100 includes an example media device 105, an example media meter 110, an example Smart TV device 115, an example service provider 120, example set top boxes (STBs) 125, an example addressable ad provider 130, an example network 135, an example network interface 140, and an example data center 145. The data center 145 further includes an example meter data analyzer 150, an example panel database 155, an example return path data (RPD) collector 160, an example RPD database 165, an example Smart TV data collector 170, an example Smart TV database 175, an example addressable ad data collector 180, an example addressable ad database 185, an example C3-C7 calculator 190, and an example ad ratings determiner 195.

The example media device 105 is used to access and view different media. The example the media device 105 can be implemented with any device or combinations of devices that are able to connect to media such as, for example, a smart television (TV), a set-top box (STB), a game console, a digital video recorder (DVR), an Apple TV, a Roku device, YouTube TV, an Amazon fire device, other over-the-top (OTT) devices, etc., or any combination thereof.

The example media meter 110 collects media monitoring information from the media device 105. In some examples, the media meter 110 is associated with (e.g., installed on, coupled to, etc.) to the example media device 105. For example, the media device 105 associated with the media meter 110 presents media (e.g., via a display, etc.). In some examples, the media device 105 that is associated with the media meter 110 additionally or alternatively presents the media on separate media presentation equipment (e.g., speakers, a display, etc.). In such examples, the media meter 110 can have direct connections (e.g., physical connections) to the media device 105, and/or may be connected wirelessly (e.g., via Wi-Fi, via Bluetooth, etc.) to the media device 105.

Additionally or alternatively, in some examples, the media meter 110 is a portable meter carried by one or more individual people. In the illustrated example, the media meter 110 monitors media presented to one or more people associated with the media meter 110 and generates the monitoring data. In some examples, the monitoring data generated by the media meter 110 can include watermarks or signatures associated with the presented media. For example, the media meter 110 can determine a watermark (e.g., generate watermarks, extract watermarks, etc.) and/or a signature (e.g., generate signatures, extract signatures, etc.) associated with the presented media. Accordingly, the monitoring data can include media signatures and/or media watermarks representative of the media monitored by the media meter 110. In some examples, the media meter 110 provides the monitoring data to the data center 145 via the example network 135.

The example Smart TV device 115 is a television that is able to connect to a network, such as the internet, and run applications. The example Smart TV device 115 may also include technology that allows advertisers to push specific advertisements to targeted households. In some examples, the Smart TV device 115 includes technology (e.g., an automatic content recognition (ACR) chip) for determining what media (e.g., an advertisement, television show, etc.) is presented on the Smart TV device 115. For example, the Smart TV device 115 may include an ACR chip that takes a picture of what is presented on the screen periodically (e.g., once every two second, once every ten seconds, etc.). In some such examples, the ACR chip in the Smart TV device 115 uses a reference library to perform matching through image fingerprinting (e.g., comparing a compressed screen shot of the media on the screen to image fingerprints stored in the reference library). The Smart TV device 115 determines what media is presented on the screen of the Smart TV device 115. In some examples, the Smart TV device 115 provides the identified media from the image fingerprinting to the data center 145 via the example network 135.

In the illustrated example of FIG. 1, the example service provider 120 collects return path data from the example STBs 125 in households. In some examples, the example STBs 125 generates data that may include, for example, tuning events and/or commands received by the STBs 125 (e.g., power on, power off, change channel, change input source, start presenting media, pause the presentation of media, record a presentation of media, volume up/down, etc.). The data from the example STBs 125 may additionally or alternatively include commands sent to a content provider by the STBs 125 (e.g., such as one or more commands to switch input sources, record a media presentation, delete a recorded media presentation, etc., and/or data related to one or more commands, such as the time/date a media presentation was started, the time a media presentation was completed, etc.), heartbeat signals, or the like. The data from the STBs 125 may additionally or alternatively include a household identification (e.g., a household ID) and/or a STB identification (e.g., a STB ID). The example service provider 120 collects return path data from the data of the STBs 125. The example service provider 120 may include a cable television service provider, a satellite television service provider, a streaming media service provider, a content provider, etc. In some examples, the return path data collected by the service provider 120 includes any or all of linear real time data from an STB, guide user data from a guide server, click stream data, key stream data (e.g., any click on the remote—volume, mute, etc.), interactive activity (such as Video On Demand) and any other data (e.g., data from middleware). In some examples, the service provider 120 provides the return path data to the data center 145 via the example network 135.

The example addressable ad provider 130 is an advertisement provider that provides addressable advertisements to selected households. The example addressable ad provider 130 pushes specific advertisements to targeted households (e.g., a household with demographic information that indicates there is a baby in the household may be targeted to receive a diaper advertisement instead of a car advertisement). In examples disclosed herein, an addressable advertisement is an advertisement that is shown to a specific media device in a household. The example addressable ad provider 130 identifies the target households for specific advertisements for different times (e.g., minutes) during a telecast. In some examples, the addressable ad provider 130 provides data identifying households that received the different addressable advertisements at the different times during a telecast to the data center 145 via the example network 135.

The example network 135 is a network used to transmit the monitoring data, Smart TV data, return path data, and addressable advertisement data to the example data center 145 via the network interface 140. In some examples, the network 135 can be the Internet or any other suitable external network. In other examples, any other suitable means of transmitting the monitoring data, Smart TV data, return path data, and addressable advertisement data to the data center 145 can be used.

The example data center 145 is an execution environment used to implement the example meter data analyzer 150, the example panel database 155, the example RPD collector 160, the example RPD database 165, the example Smart TV data collector 170, the example Smart TV database 175, the example addressable ad data collector 180, the example addressable ad database 185, the example C3-C7 calculator 190, and the example ad ratings determiner 195. In some examples, the data center 145 is associated with a AME. In some examples, the data center 145 can be a physical processing center (e.g., a central facility of the AME, etc.). Additionally or alternatively, the data center 145 can be implemented via a cloud service (e.g., AWS™, etc.).

In the illustrated example of FIG. 1, the meter data analyzer 150 collects, via the network interface 140 in communication with the example network 135, the monitoring data from example media meter 110, which monitors media exposure associated with example media device 105 (e.g., televisions, radios, computers, tablet devices, smart phones, etc.) in panel homes recruited by an AME. The example meter data analyzer 150 processes the gathered media monitoring data to detect, identify, credit, etc. respective media assets and/or portions thereof (e.g., media segments) associated with the corresponding monitoring data. For example, the meter data analyzer 150 can compare the monitoring data to generated reference data to determine what respective media assets and/or media segments are associated with the corresponding monitoring data. In some examples, the meter data analyzer 150 can hash the signatures included in the monitoring data. In some examples, the meter data analyzer 150 can identify the media by matching unhashed signatures and/or hashed signatures. In some examples, the meter data analyzer 150 can identify media by matching watermarks included in the monitoring data to reference watermarks that are mapped to media identifying information. The meter data analyzer 150 of the illustrated example also analyzes the monitoring data to determine if a media asset, and/or particular portion(s) (e.g., segment(s)) thereof, is to be credited as a media exposure represented in the monitoring data. The example meter data analyzer 150 stores the identified monitoring data as panel data (e.g., monitoring data associated with panel households) along with additional panel household information (e.g., demographic information, geographic location, etc.) from the media meter 110 in the example panel database 155.

The example RPD collector 160 collects, via the network interface 140 in communication with the example network 135, the return path data from the example service provider 120 for associating with the example STBs 125. The RPD collector 160 stores the return path data along with additional household information (e.g., demographic information, geographic location, etc.) from the STBs 125 in the example RPD database 165.

The example Smart TV data collector 170 collects, via the network interface 140 in communication with the example network 135, the Smart TV data from the example Smart TV device 115 for monitoring media exposure associated with the example Smart TV device 115 households. The Smart TV data collector 170 stores the Smart TV data along with additional household information (e.g., demographic information, geographic location, etc.) from the Smart TV device 115 in the example Smart TV database 175.

The example addressable ad data collector 180 collects, via the network interface 140 in communication with the example network 135, the addressable advertisement data from the example addressable ad provider 130 for monitoring addressable advertisement exposure associated with media devices in target households. The addressable ad data collector 180 stores the addressable advertisement data along with additional household information (e.g., demographic information, geographic location, etc.) for the household selected by the addressable ad provider 130 in the example addressable ad database 185.

The example C3-C7 calculator 190 obtains the panel data, return path data, Smart TV data, and reference advertisement data from the example panel database 155, the example RPD database 165, the example Smart TV database 175, and the example addressable ad database 185, respectively. The C3-C7 calculator 190 combines the panel data, the return path data, the Smart TV data, and the reference advertisement data. The C3-C7 calculator 190 analyzes the combined panel data, the return path data, the Smart TV data, and the reference advertisement data by identifying data associated with advertisement exposure (linear advertisements and addressable advertisements), removing duplicate data, etc. The example C3-C7 calculator 190 identifies respondents that received addressable advertisements and respondents that received linear advertisements from the combined and analyzed panel data, the return path data, the Smart TV data, and the reference advertisement data. The example C3-C7 calculator 190 calculates the average commercial minute ratings for minutes in a telecast that were addressable advertisements and linear advertisements. The example C3-C7 calculator 190 transmits the average commercial minute ratings to the example ad ratings determiner 195. The example C3-C7 calculator 190 is described in further detail below in connection with FIG. 2.

The example ad ratings determiner 195 determines ratings data and/or other audience metrics by using the average commercial minute ratings from the C3-C7 calculator 190. In some examples, the ad ratings determiner 195 can use the ratings data to select addressable advertisements for respondents, modify the linear advertisements and addressable advertisements, disable addressable advertisements for target respondents, etc. In some examples, the ad ratings determiner 195 generates a report including data metrics regarding media exposure events for advertisements during a telecast that may be presented to media providers and advertisers.

Figure 2:
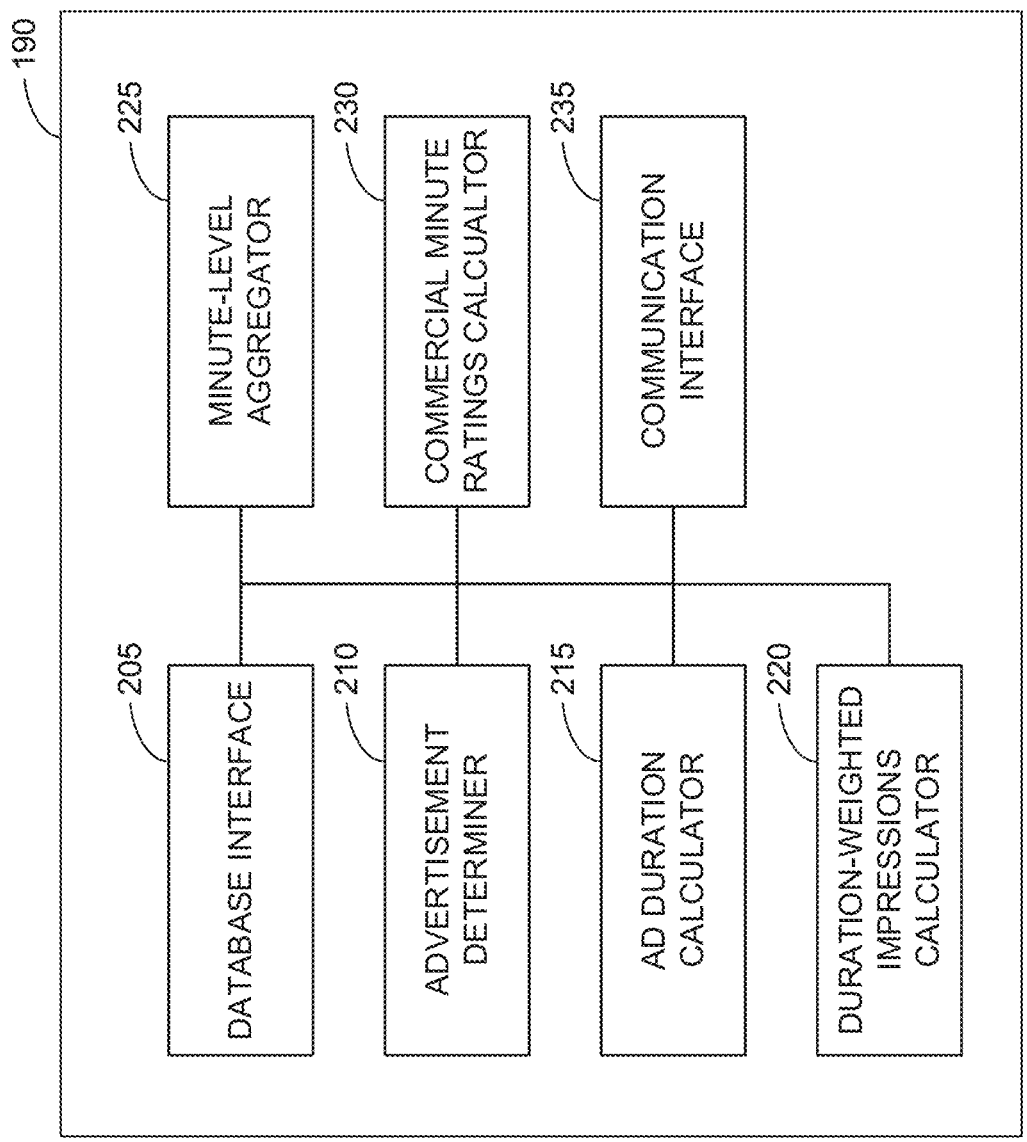
FIG. 2 is a block diagram of an example C3-C7 calculator included in the example environment of FIG. 1.

FIG. 2 is a block diagram of an example implementation of the C3-C7 calculator 190 included in the example environment 100 of FIG. 1. The example C3-C7 calculator 190 of FIG. 2 includes an example database interface 205, an example advertisement determiner 210, an example ad duration calculator 215, an example duration weighted impressions calculator 220, an example minute-level aggregator 225, an example commercial minute ratings calculator 230, and an example communication interface 235.

The example database interface 205 obtains the panel data, return path data, Smart TV data, and reference advertisement data from the example panel database 155, the example RPD database 165, the example Smart TV database 175, and the example addressable ad database 185, respectively. In some examples, the panel data collected from media devices (e.g., the example media device 105 of FIG. 1), the return path data collected from service providers (e.g., the example service provider 120 of FIG. 1), and the Smart TV data collected from Smart TV devices (e.g., the example Smart TV device 115 of FIG. 1) are referred to as program tuning data of households. The database interface 205 combines the panel data, the return path data, the Smart TV data, and the reference advertisement data. The database interface 205 analyzes the combined panel data, the return path data, the Smart TV data, and the reference advertisement data by identifying data associated with advertisement exposure (linear advertisements and addressable advertisements), removing duplicate data, etc.

The example advertisement determiner 210 identifies respondents that received addressable advertisements and respondents that receive linear advertisements. In examples disclosed herein, a respondent may include a household, an individual person, an individual media device, etc. The advertisement determiner 210 identifies the respondents that received addressable advertisements and the respondents that receive linear advertisements from the combined program tuning data and the reference advertisement data from the example database interface 205.

The example ad duration calculator 215 calculates advertisement durations at the respondent-level. The ad duration calculator 215 calculates the durations for linear advertisements and for addressable advertisements. In some examples, the ad duration calculator 215 determines the durations of a linear advertisement and an addressable advertisement in seconds for each minute in a telecast. For example, during one minute of a telecast, the ad duration calculator 215 determines that a linear advertisement was presented for 45 seconds during the minute and an addressable advertisement was presented for 15 seconds during the minute.

The example duration weighted impressions calculator 220 calculates duration weighted impressions at the respondent-level based on the durations of linear advertisements and the durations of addressable advertisements calculated by the ad duration calculator 215. The duration weighted impressions calculator 220 calculates the duration weighted impressions for the respondents. In examples disclosed herein, impressions are the sums of weights of individual respondents that viewed the advertisements during a given minute. In some examples, the duration weighted impressions calculator 220 calculates the duration weighted impressions for the linear advertisements and addressable advertisements using Equations 1a and 1b below.

duration weighted linear impressions=weight*linear duration  (Equation 1a)

duration weighted addressable impressions=weight*addressable duration  (Equation 1b)

As illustrated in Equations 1a, 1b above, the duration weighted impressions account for weight values associated with each respondent and the durations of the linear advertisements and addressable advertisements calculated by the ad duration calculator 215. In such examples, the duration weighted impressions include weighting values from the respondents to correct for potential bias in households affected by the Smart TV data collection. In some examples, the additional weighting step includes giving panel households that are in the same footprint as the Smart TV households an additional weight (the weight being larger than the weight added to the Smart TV households) that can be applied to the tuning/viewing data from the non-Smart TV devices of those panel households. Giving additional weight to the viewing data in the panel households that have data collected from all devices allows for closing the gap introduced by using Smart TVs for measurement.

The example minute-level aggregator 225 aggregates the duration weighted impressions from the duration weighted impressions calculator 220 to the minute-level. The minute-level aggregator 225 aggregates the duration weighted impressions for linear advertisements and addressable advertisements for the respondents for each commercial minute in the telecast. The minute-level aggregator 225 sums the duration weighted impressions for each commercial minute using the below Equations 2a and 2b.

total duration wtd linear impressions=Σ(weight*linear duration)  (Equation 2a)

total duration wtd addressable impressions=Σ(weight*addressable duration)  (Equation 2b)

The minute-level aggregator 225 determines the total commercial duration for the telecast in seconds (e.g., across all commercial minutes). The minute-level aggregator 225 determines the minute-level impressions across the telecast for both the linear advertisements and the addressable advertisements by dividing the resulting total duration weighted impressions from Equations 2a, 2b above by the total commercial duration for the telecast.

The example commercial minute ratings calculator 230 calculates the average commercial minute ratings based on the minute-level duration weighted impressions from the example minute-level aggregator 225. The commercial minute ratings calculator 230 calculates the average commercial minute rating for the addressable advertisement and the average commercial minute rating for the linear advertisement using the total duration weighted impressions of the addressable advertisement, the total duration weighted impressions of the linear advertisement, and a total number of commercial seconds from the example minute-level aggregator 225. The example commercial minute ratings calculator 230 may calculate the average commercial minute ratings using Equations 3a and 3b below.

$$\text{average linear commercial minute rating} = \frac{\text{total duration } wtd \text{ linear impressions}}{\text{total commercial duration}} \quad \text{(Equation 3a)}$$

$$\text{average addressable commercial minute rating} = \frac{\text{total duration } wtd \text{ addressable impressions}}{\text{total commercial duration}} \quad \text{(Equation 3b)}$$

In Equations 3a, 3b above, the total commercial duration represents the sum of the total duration of the linear advertisement in seconds and the total duration of the addressable advertisement in seconds. The commercial minute ratings calculator 230 determines the average commercial minute ratings while accounting for different advertisement durations at the respondent-level to depict changes in an audience for linear advertisements and addressable advertisements in a telecast.

The example communication interface 235 transmits the average commercial minute ratings (e.g., the average linear commercial minute ratings and the average addressable commercial minute ratings) from the commercial minute ratings calculator 230 to the example ad ratings determiner 195 of FIG. 1. The example communication interface 235 transmits the average commercial minute ratings for the linear advertisements and addressable advertisements to the ad ratings determiner 195 to credit the addressable advertisement and the linear advertisement with audience viewership metrics.

Figure 3:
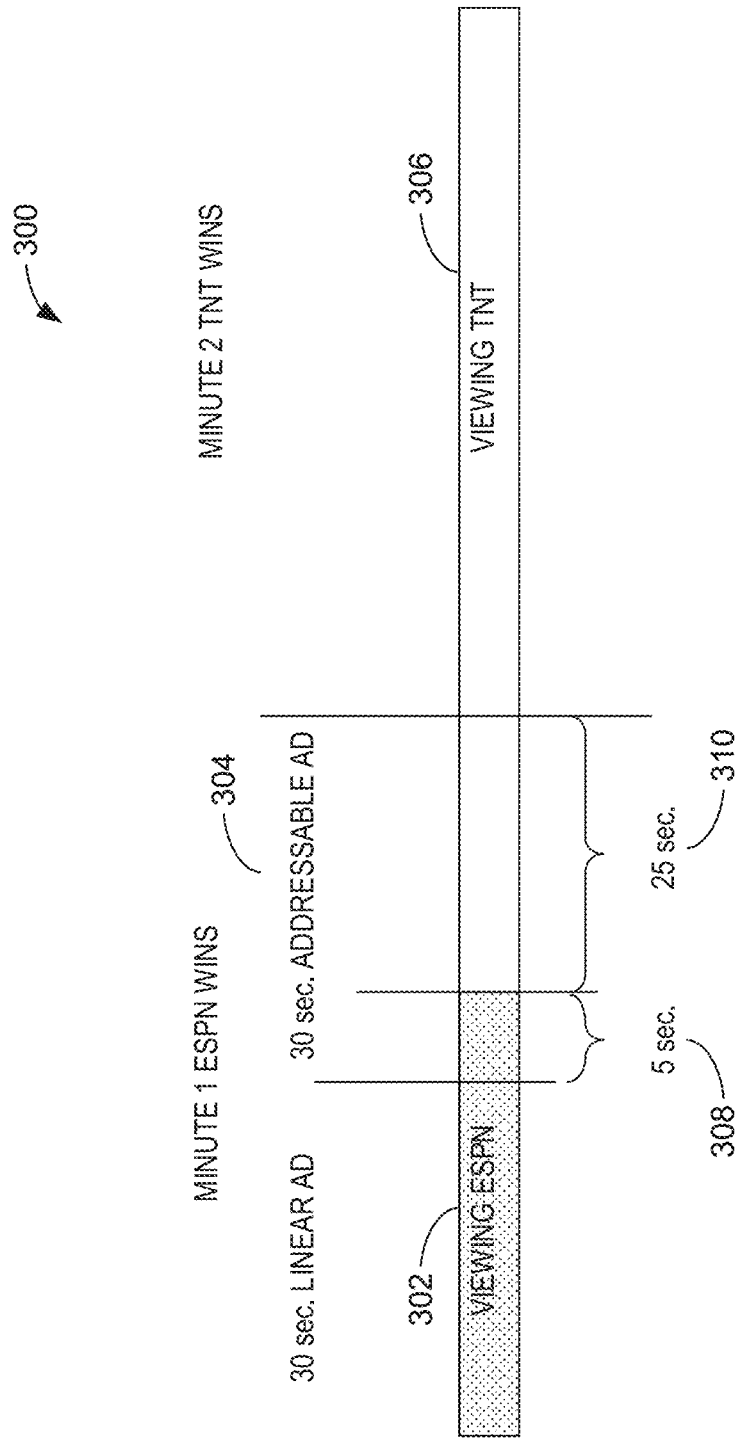
FIG. 3 illustrates an example of a linear advertisement and an addressable advertisement during media viewing.

FIG. 3 illustrates an example of a linear advertisement and an addressable advertisement during an example media viewing 300. The example media viewing 300 includes an example first program 302, an example addressable advertisement period 304, and an example second program 306. The example addressable advertisement period 304 includes an example first time period 308 and an example second time period 310. The example of FIG. 3 illustrates an example of two minutes of viewing. In the illustrated example, the user views media on the example first program 302 (e.g., ESPN) for a first minute. During the first program 302, there is a linear advertisement for 30 seconds followed by an addressable advertisement period 304. In the illustrated example, the user views the addressable advertisement period 304 for the first time period 308 (e.g., five seconds) on the first program 302. After the first time period 308, the user tunes to the second program 306 (e.g., TNT). In the illustrated example, the first time period 308 (e.g., five seconds) is credited to the addressable advertisement on the first program 302. The second time period 310 is credited towards the linear commercial total on the first program 302 instead of credited as viewing the second program 306 because if the viewer is not viewing the addressable advertisement during the second time period 310, then the C3-C7 metric assumes the second time period 310 should be credited to the linear advertisement on the first program 302.

FIGS. 4A, 4B illustrate example results 400, 410 of the example database interface 205 included in the example C3-C7 calculator 190 of FIG. 2 combining panel data and Smart TV data and identifying an addressable audience. The example results 400 of FIG. 4A illustrate the example database interface 205 combining the panel data, return path data, and the Smart TV data. The example results 400 include example C3 ratings 402, 404, 406 for a telecast before accounting for addressable advertisements. In the illustrated example, the results 400 include C3 ratings for the telecast based on the data obtained by the database interface 205. In the illustrated example, the database interface 205 obtains panel data for the C3 rating 402. The database interface 205 obtains panel data and Smart TV data and combines the data for the C3 rating 404. The database interface 205 obtains Smart TV data for the C3 rating 406.

FIG. 4B illustrates the results 410 for an addressable advertisement audience from reference advertisement data. The results 410 include example universe device impressions 412, example target impressions 414, and example reportable impressions 416. The example database interface 205 obtains the reference advertisement data to identify the universe device impressions 412, example target impressions 414, and example reportable impressions 416. In examples disclosed herein, not all devices (e.g., Smart TV device, other media devices, etc.) in the universe device impression 412 meet a desired target demographic for an addressable advertisement or are not able to receive addressable advertisements (e.g., lack of technology). The target impression 414 represents the number of impressions based on targeted households for an addressable advertisement. However, not all targeted households see the addressable advertisement (e.g., change of the channel, etc.). The reportable impressions 416 illustrate the number of target household with reportable impressions for viewing the addressable advertisement. The example database interface 205 obtains the panel data, return path data, and Smart TV data illustrated in the example results 400 and the reference addressable advertisement data illustrated in the example results 410 to adjust the C3-C7 metric for addressable advertisement impressions.

FIGS. 5A, 5B illustrate example results 500, 530 of recalculating minute-level audience data and reconciling C3-C7 metric. The example results 500 of FIG. 5A illustrate recalculating minute-level audience impressions based on the results 400 and 410 of FIGS. 4A, 4B. The example results 500 include example advertisements 502-510, example commercial minutes 512, example advertisement brands 514, example minute-level impressions 516, example addressable impressions 518, and example linear impressions 520. In the illustrated example, the addressable impressions 518 and the linear impressions 520 for the advertisements 502-510 are determined from the minute-level impressions 516.

The example results 530 of FIG. 5B illustrate reconciling the C3-C7 metric to calculate ACM ratings based on the minute-level audience impressions from the example results 500 of FIG. 5A. The example results 530 include an example telecast 532, an example program 534, an example network 536, an example prior C3 impression 538, an example prior C3 impression 540, an example reconciled C3 impression 542, and an example delta C3 metric 544. In the illustrated example, the prior C3 impression 538 illustrates the C3 impressions that do not differentiate between linear advertisement impressions and addressable advertisement impressions (e.g., the addressable impressions 518 and the linear impressions 520) based on panel data. In the illustrated example, the prior C3 impression 540 illustrates the C3 impressions that do not differentiate between linear advertisement impressions and addressable advertisement impressions (e.g., the addressable impressions 518 and the linear impressions 520) based on panel data, return path data, and Smart TV data. The reconciled C3 impression 542 illustrates the C3 impressions that different between linear advertisement impressions and addressable advertisement impressions (e.g., the addressable impressions 518 and the linear impressions 520) according to the teachings of this disclosure. In the illustrated example, the delta C3 metric 544 illustrates the difference between the prior C3 impression 540 and the reconciled C3 impressions 542 at the respondent level based on the difference between the linear advertisement impressions and addressable advertisement impressions. Although the delta C3 metric 544 is the difference between the C3 model calculating impressions when not differentiating linear impressions and addressable impressions (e.g., prior C3 impression 540) and when differentiating linear impressions and addressable impressions (e.g., the reconciled C3 impressions 542), the delta C3 metric 544 does not illustrate the number of addressable impressions.

FIG. 6 illustrates example results for an ACM report 600 based on duration weighted impressions during the commercial minutes of a telecast without accounting for linear advertisements and addressable advertisements. In the illustrated example, the C3-C7 commercial metrics report the ACM which is the average number of duration weighted impressions during the commercial minutes of a telecast. Therefore, every commercial during the same telecast will have the same ACM rating. The example ACM report 600 includes example program name 602, example telecast start time 604, example minutes of telecast 606, example commercial durations 608, example impressions 610, and example duration weighted impressions 612 for each of example commercial minutes 614, 616, 618. The ACM report 600 illustrates a ten minute long telecast that has commercials during the minutes 4-6 (e.g., commercial minutes 614, 616, 618). In the illustrated example, the impressions 610 of the commercial minutes 614, 616, 618 are duration weighted by multiplying the impressions 610 by the commercial duration 608. For example, for commercial minute 614, the impressions 610 (e.g., 25,034) is multiplied by the commercial duration 608 (e.g., 24) to determine the duration weighted impression 612 (e.g., 600,816). In the illustrated example, the duration weighted impressions 612 do not differentiate impressions for linear advertisements and addressable advertisements for the commercial minutes 614, 616, 618. In the illustrated example, the ACM rating for the telecast is found by determining the total duration weighted impression for the telecast (e.g., 2,799,306) and determining the total for the commercial duration 608 (e.g., 134). The ACM rating from the ACM report 600 is the total duration weighted impressions divided by the total commercial duration (e.g., 2,799,306/134=20,890). The ACM rating for the ACM report 600 is the same for all commercials during the commercial minutes 614, 616, 618 (e.g., no differentiation between linear advertisements and addressable advertisements).

FIG. 7 illustrates example results for an ACM report 700 after an addressable advertisement insertion. The example ACM report 700 includes example program names 702, example telecast start times 704, example commercial durations 708, example impressions 710, and example duration weighted impressions for an example linear advertisement 714 and an example addressable advertisement 716. The ACM report 700 illustrates the addressable advertisement 716 that is inserted in minute five of the telecast to some target households. In the illustrated example, the ACM computations illustrated in the example of FIG. 6 are not applicable when an addressable advertisement (e.g., the addressable advertisement 716) is inserted into a commercial minute of the telecast because different households will see different advertisements of differing durations at different time of the commercial minutes (and, thus, all commercials do not have the same ACM rating as illustrated in FIG. 6). The ACM report 700 determines the duration weighted impressions 712 for the linear advertisement 714 and the addressable advertisement 716 separately to determine different ACM ratings. In the illustrated example, the ACM rating for the linear advertisements only is determined to be 18,070 by dividing the total linear impressions 710 (e.g., excluding the impressions 710 for the addressable advertisement 716) by the total commercial duration 708 (e.g., 2,421,426/134=18,070). The ACM rating of 18,070 for the linear advertisements of the ACM report 700 is different from the prior ACM ratings determined in the ACM report 600 (20,890). FIG. 7 illustrates that the ACM ratings calculations from FIG. 6 are not applicable when an addressable advertisement is inserted in the telecast. In some examples, if the linear advertisement 714 and the addressable advertisement 716 are not the same length/duration (e.g., the addressable advertisement 716 has a commercial duration 708 of 15 seconds), there are remaining seconds (e.g., 45 seconds) of linear advertisements that would be eligible for the C3 metric. However, the remaining seconds (e.g., the 45 seconds in the illustrated example) would not be accounted for based on the ACM calculations illustrated in FIGS. 6 and 7.

FIG. 8 illustrates example results for an ACM report 800 with different addressable advertisements during different telecast minutes. The example ACM report 800 includes example program names 802, example telecast start times 804, example telecast minutes 806, example commercial durations 808, example impression 810, and example duration weighted impressions 812 for the example linear advertisement 814, the example addressable advertisement 816, the example addressable advertisement 818, and the example combination addressable advertisement 820 for minute 5 and the example addressable advertisement 822, the example addressable advertisement 824, and the example linear advertisement 826 for minute 6. In the illustrated example, the ACM computations illustrated in the example of FIG. 6 are not applicable when multiple addressable advertisements inserted into a commercial minute of the telecast. The ACM report 800 illustrates how during a commercial minute (e.g., minute 5), some households may see the linear advertisement 814, some households may see the addressable advertisement 816, some households may see the addressable advertisement 816, and some households may see a combination addressable advertisement 820 (e.g., a portion of the addressable advertisement 816 and a portion of the addressable advertisement 818). FIG. 8 illustrates that the ACM ratings calculations from FIG. 6 are not applicable when multiple addressable advertisement and/or combinations of addressable advertisements are inserted in the telecast. Simply calculating an ACM rating for all commercials during the telecast in the ACM report 800 would not account for the different impressions of the linear advertisement 814, the addressable advertisement 816, the addressable advertisement 818, and the combination addressable advertisement 820 for minute 5 and the addressable advertisement 822, the addressable advertisement 824, and the linear advertisement 826 for minute 6. Examples disclosed herein reconcile the C3-C7 metric to determine the ACM ratings for the telecast that account for differences in linear advertisements and addressable advertisement.

FIG. 9 illustrates example viewership for the linear advertisement and addressable advertisement over different telecast minutes in accordance with the teachings of this disclosure. An example Table 900 of FIG. 9 includes example program names 902, example telecast start times 904, example telecast minutes 906, example commercial durations 908, example impressions 910, and example duration weighted impressions 912 for the example advertisements 914-920. In the illustrated example, during minute 5 of the telecast minutes 906, the advertisement 914 illustrates households exposed to a linear advertisement, the advertisement 916 illustrates households exposed to 45 seconds of the linear advertisement and 15 seconds of a first addressable advertisement, the advertisement 918 illustrates households exposed to 40 seconds of the linear advertisement and 20 seconds of a second addressable advertisement, and the advertisement 920 illustrates household exposed to 25 seconds of the linear advertisement and 35 seconds of the first addressable advertisement and the second addressable advertisement. Examples disclosed herein calculate ACM ratings to account for different durations and exposures to linear advertisement and addressable advertisement combinations. In the illustrated example, the impressions 910 are the sums of weights of individual respondents (households or persons) that viewed the advertisement (e.g., the linear advertisement or addressable advertisement) during a given telecast minute 906. The duration weighted impressions 912 at the respondent level are able to adjust for different advertisement exposures and durations as seen in the example Table 900.

Figure 10:
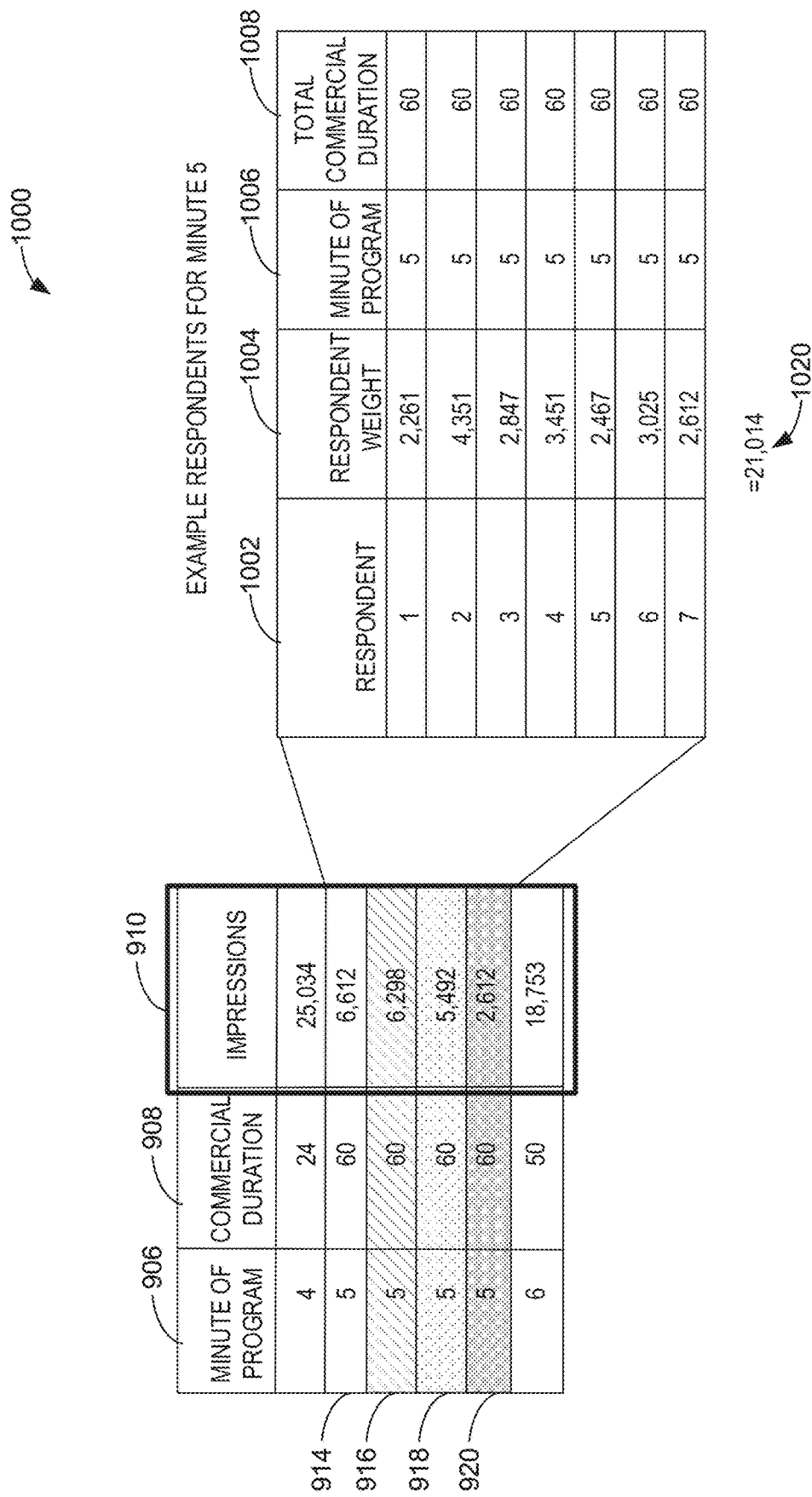
FIG. 10 illustrates example viewership results at the respondent-level.

FIG. 10 illustrates example viewership results 1000 at the respondent-level. The example viewership results 1000 includes the example telecast minutes 906, the example commercial durations 908, and the example impressions 910 for the example advertisements 914-920 of FIG. 9. The viewership results 1000 further includes example respondents 1002, example respondent weights 1004, example telecast minutes 1006, and example total commercial durations 1008 based on the telecast minutes 906, the commercial durations 908, and the impressions 910 for the advertisements 914-920. The viewership results 1000 illustrate the different weights for respondents during a telecast. The viewership results 1000 include example total respondent weight 1020 (21,014), which is the sum of the respondent weights during the telecast for minute 5 of the telecast minutes 1006 (the same minute as the advertisements 914-920). The example respondent weights 1004 may be used by the example duration weighted impressions calculator 220 of FIG. 2 to determine the duration weighted impressions for the advertisements 914-920, which is described in further detail below in connection with FIG. 11.

FIG. 11 illustrates example results 1100 of the example duration weighted impressions calculator 220 included in the example C3-C7 calculator 190 of FIG. 2. The example results 1100 include the example telecast minutes 906, the example commercial durations 908, and the example impressions 910 for the example advertisements 914-920 of FIG. 9 and the example respondents 1002, the example respondent weights 1004, and the example telecast minutes 1006 of FIG. 10. The results 1100 further include example linear durations 1102, example addressable durations 1104, example duration weighted linear impressions 1106, and example duration weighted addressable impressions 1108. The example duration weighted impressions calculator 220 calculates the duration weighted linear impressions 1106 and the duration weighted addressable impressions 1108 using Equations 1a, 1b, as described above in connection with FIG. 2. The example duration weighted impressions calculator 220 calculates the duration weighted linear impressions 1106 and the duration weighted addressable impressions 1108 using the linear durations 1102 and the addressable durations 1104 from the example ad duration calculator 215 of FIG. 2 and the respondent weights 1004.

Figure 12:
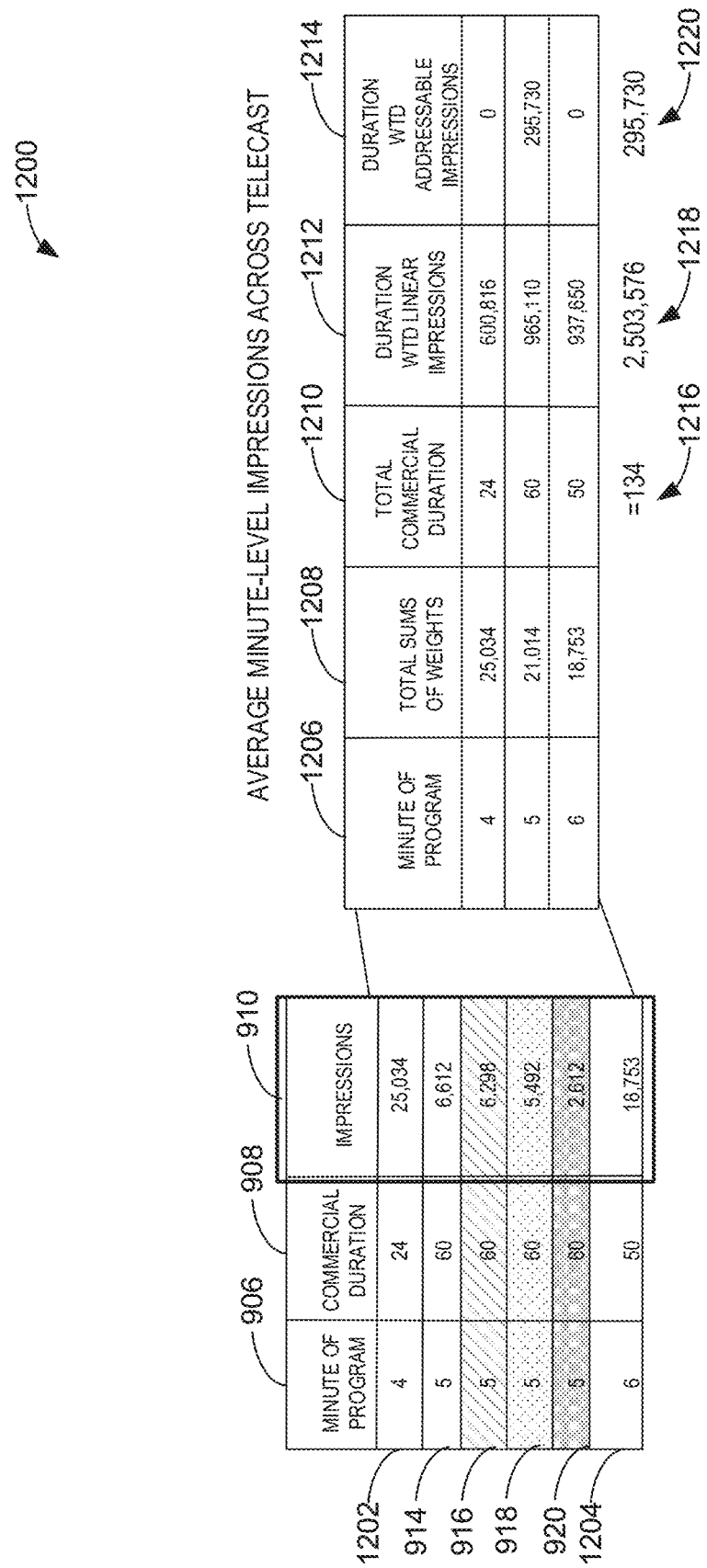
FIG. 12 illustrates an example output of an example minute-level aggregator included in the example C3-C7 calculator of FIG. 2.

FIG. 12 illustrates example results 1200 of the example minute-level aggregator 225 included in the example C3-C7 calculator 190 of FIG. 2. The example results 1200 include the example telecast minutes 906, the example commercial durations 908, and the example impressions 910 for the example advertisements 914-920 of FIG. 9 and for example advertisements 1202, 1204. The results 1200 further include example telecast minutes 1206, example total weight sums 1208, example total commercial durations 1210, example duration weighted linear impressions 1212, and example duration weighted addressable impressions 1214. The results 1200 illustrate the minute-level aggregator 225 aggregating the respondent-level results 1100 of FIG. 11 from the example duration weighted impressions calculator 220. The example minute-level aggregator 225 sums the duration weighted impressions (e.g., the example duration weighted linear impressions 1106 and the example duration weighted addressable impressions 1108 of FIG. 11) across each commercial minute using the Equations 2a, 2b, as described above in connection with FIG. 2, to determine the duration weighted linear impressions 1212 and the duration weighted addressable impressions 1214. The example results 1200 includes an example total telecast commercial duration 1216, an example total duration weighted linear impression 1218, and an example total duration weighted addressable impression 1220. The minute-level aggregator 225 determines the total telecast commercial duration 1216 to be 134 seconds, the total duration weighted linear impression 1218 to be 2,503,576, and the total duration weighted addressable impression 1220 to be 295,73. The total telecast commercial duration 1216, the total duration weighted linear impression 1218, and the total duration weighted addressable impression 1220 are used by the example commercial minute ratings calculator 230 of FIG. 2, as described in further detail below in connection with FIG. 13.

FIG. 13 illustrates example results 1300 of the example commercial minute ratings calculator 230 included in the example C3-C7 calculator 190 of FIG. 2. The example results 1300 include the example telecast minutes 906, the example commercial durations 908, and the example impressions 910 for the example advertisements 914-920 of FIG. 9 and for example advertisements 1202, 1204 of FIG. 12. The results 1300 further include example telecast minutes 1206, example total weight sums 1208, example total commercial durations 1210, example duration weighted linear impressions 1212, and example duration weighted addressable impressions 1214 of FIG. 12, example linear commercial minute ratings 1302, and example addressable commercial minute ratings 1304. The commercial minute ratings calculator 230 determines the linear commercial minute ratings 1302 and the addressable commercial minute ratings 1304 using the Equations 3a, 3b, as described in detail above in connection with FIG. 2. In some examples, when a minute in the telecast minutes 1206 has only duration weighted linear impressions 1212 (e.g., the duration weighted addressable impressions is 0), the linear commercial minute ratings 1302 are equivalent to summing the respondent weights. The example commercial minute ratings calculator 230 determines total linear commercial minute ratings and total addressable commercial minute ratings using the total telecast commercial duration 1216, the total duration weighted linear impression 1218, and the total duration weighted addressable impression 1220 of FIG. 12 from the example minute-level aggregator 225 of FIG. 2. For examples, the total linear commercial minute ratings is determined to be 18,683 (e.g., 2,503,576/134=18,683) and the total addressable commercial minute ratings is determined to be 2,207 (e.g., 295,730/134=2,207). The total linear commercial minute ratings and total addressable commercial minute ratings from the results 1300 illustrate ACM ratings for different advertisements (linear advertisements and addressable advertisements) that may also have different advertisement durations, which improve the depiction of changes in the audience for different advertisements.

FIGS. 14A, 14B illustrate example ACM reports 1400, 1410 from the ad ratings determiner 195 of FIG. 1. The example ACM report 1400 of FIG. 14A illustrates an example report for the reconciled C3 metric based on the results of the C3-C7 calculator 190 of FIG. 1. The example ACM report 1400 includes example C3 currency average audience estimates 1402, example adjusted C3 average audience estimates 1404, example targeted impressions 1406, and example reconciled C3 average audience estimates 1408. The example C3 currency average audience estimates 1402 illustrates the average audience estimates for a program using the prior C3 calculation using only panel data to determine currency estimates. The example adjusted C3 average audience estimates 1404 illustrates the average audience estimates for a program using an adjusted C3 calculation with panel data and ACR data. The example targeted impressions 1406 illustrates a total target number of impressions for average audience watching the program (how many target individuals from the audience being measured that are targeted for watching the program during the duration). The example reconciled C3 average audience estimates 1408 illustrates the average audience estimates for a program using the reconciled C3 calculation from the results of the C3-C7 calculator 190 of FIG. 1. In the illustrated example, each of the C3 currency average audience estimates 1402, the adjusted C3 average audience estimates 1404, and the reconciled C3 average audience estimates 1408 include "AA %" columns that represent average audience percentage (the percent of the total population being measured that was watching the program) and "AA Projection" columns that represent the average audience watching the program represented in terms of impressions (how many actual individuals from the audience being measured were watching the program on average during the duration).

The example ACM report 1410 of FIG. 14B illustrates an example report for the reconciled minute based on the results of the C3-C7 calculator 190. The example ACM report 1410 includes example C3 currency average audience estimates 1412, example adjusted C3 average audience estimates 1414, example targeted impressions 1416, and example reconciled C3 average audience estimates 1418. The example C3 currency average audience estimates 1412 illustrates the average audience estimates for program minutes using the prior C3 calculation using only panel data to determine currency estimates. The example adjusted C3 average audience estimates 1414 illustrates the average audience estimates for program minutes using an adjusted C3 calculation with panel data and ACR data. The example targeted impressions 1416 illustrates total target number of impressions for average audience watching program minutes (how many target individuals from the audience being measured that are targeted for watching the program minute). The example reconciled C3 average audience estimates 1418 illustrates the average audience estimates for program minutes using the reconciled C3 calculation from the results of the C3-C7 calculator 190 of FIG. 1. In the illustrated example, each of the C3 currency average audience estimates 1412, the adjusted C3 average audience estimates 1414, and the reconciled C3 average audience estimates 1418 include "AA %" columns that represent average audience percentage (the percent of the total population being measured that was watching the program minute) and "AA Projection" columns that represent the average audience watching the program represented in terms of impressions (how many actual individuals from the audience being measured were watching the program minute on average).

While example manners of implementing the data center 145 and the C3-C7 calculator 190 are illustrated in FIG. 1 and FIG. 2, one or more of the elements, processes and/or devices illustrated in FIGS. 1 and 2 may be combined, divided, re-arranged, omitted, eliminated and/or implemented in any other way. Further, the example meter data analyzer 150, the example panel database 155, the example RPD collector 160, the example RPD database 165, the example Smart TV data collector 170, the example Smart TV database 175, the example addressable ad data collector 180, the example addressable ad database 185, the example ad ratings determiner 195, the example database interface 205, the example advertisement determiner 210, the example ad duration calculator 215, the example duration weighted impressions calculator 220, the example minute-level aggregator 225, the example commercial minute ratings calculator 230, the example communication interface 235 and/or, more generally, the example data center 145 and the example C3-C7 calculator 190 of FIGS. 1 and 2 may be implemented by hardware, software, firmware and/or any combination of hardware, software and/or firmware. Thus, for example, any of the example meter data analyzer 150, the example panel database 155, the example RPD collector 160, the example RPD database 165, the example Smart TV data collector 170, the example Smart TV database 175, the example addressable ad data collector 180, the example addressable ad database 185, the example ad ratings determiner 195, the example database interface 205, the example advertisement determiner 210, the example ad duration calculator 215, the example duration weighted impressions calculator 220, the example minute-level aggregator 225, the example commercial minute ratings calculator 230, the example communication interface 235 and/or, more generally, the example data center 145 and the example C3-C7 calculator 190 of FIGS. 1 and 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example meter data analyzer 150, the example panel database 155, the example RPD collector 160, the example RPD database 165, the example Smart TV data collector 170, the example Smart TV database 175, the example addressable ad data collector 180, the example addressable ad database 185, the example ad ratings determiner 195, the example database interface 205, the example advertisement determiner 210, the example ad duration calculator 215, the example duration weighted impressions calculator 220, the example minute-level aggregator 225, the example commercial minute ratings calculator 230, the example communication interface 235 is/are hereby expressly defined to include a non-transitory computer readable storage device or storage disk such as a memory, a digital versatile disk (DVD), a compact disk (CD), a Blu-ray disk, etc. including the software and/or firmware. Further still, the example data center 145 and the example C3-C7 calculator 190 of FIGS. 1 and 2 may include one or more elements, processes and/or devices in addition to, or instead of, those illustrated in FIGS. 1 and 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 15:
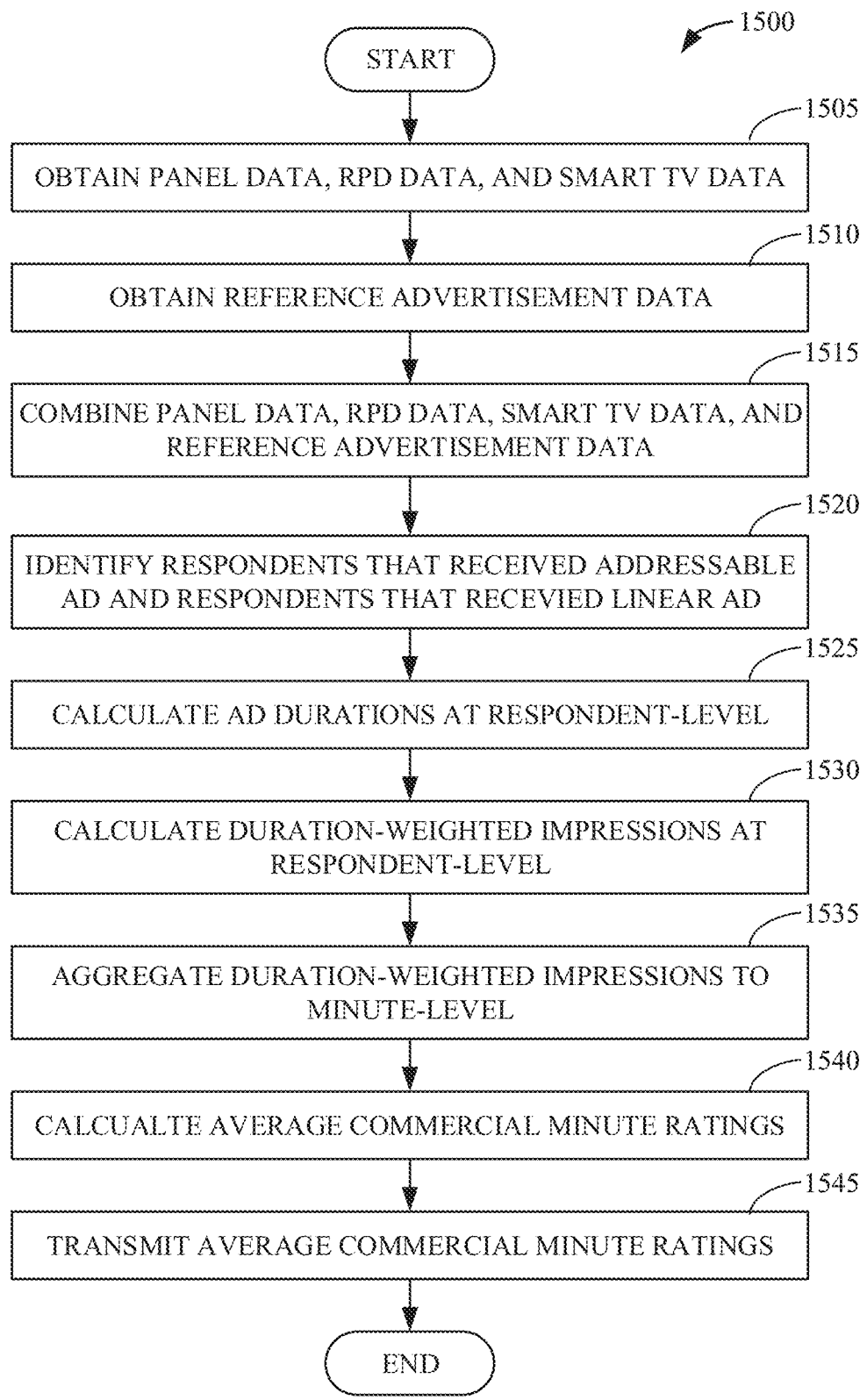
FIG. 15 is a flowchart representative of machine readable instructions which may be executed to implement the data center and the C3-C7 calculator 190 of FIGS. 1 and 2.

A flowchart representative of example hardware logic, machine readable instructions, hardware implemented state machines, and/or any combination thereof for implementing the data center 145 and the C3-C7 calculator 190 of FIGS. 1 and 2 is shown in FIG. 15. The machine readable instructions may be one or more executable programs or portion(s) of an executable program for execution by a computer processor and/or processor circuitry, such as the processor 1612 shown in the example processor platform 1600 discussed below in connection with FIG. 16. The program may be embodied in software stored on a non-transitory computer readable storage medium such as a CD-ROM, a floppy disk, a hard drive, a DVD, a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowchart illustrated in FIG. 15, many other methods of implementing the example data center 145 and the example C3-C7 calculator 190 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 15 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 15 is a flowchart representative of machine readable instructions which may be executed to implement the example data center 145 and the example C3-C7 calculator 190 of FIGS. 1 and 2. The program 1500 of FIG. 15 begins execution at block 1505 at which the example database interface 205 obtains panel data, RPD data, and Smart TV data. In some examples, the example meter data analyzer 150 determines the panel data. The example meter data analyzer 150 collects monitoring data from the example media meter 110, which monitors media exposure associated with example media device 105 (e.g., televisions, radios, computers, tablet devices, smart phones, etc.) in panel homes recruited by an AME. The example meter data analyzer 150 processes the gathered media monitoring data to detect, identify, credit, etc. respective media assets and/or portions thereof (e.g., media segments) associated with the corresponding monitoring data. The example meter data analyzer 150 stores the identified monitoring data as panel data (e.g., monitoring data associated with panel households) along with additional panel household information (e.g., demographic information, geographic location, etc.) from the media meter 110 in the example panel database 155. In some examples, the example RPD collector 160 determines the return path data. The example RPD collector 160 collects the return path data from the example service provider 120 associated with the STBs 125. The RPD collector 160 stores the return path data along with additional household information (e.g., demographic information, geographic location, etc.) from the STBs 125 in the example RPD database 165. In some examples, the example Smart TV data collector 170 determines the Smart TV data. The example Smart TV data collector 170 collects the Smart TV data from the example Smart TV device 115 for monitoring media exposure associated with the example Smart TV device 115 households. The Smart TV data collector 170 stores the Smart TV data along with additional household information (e.g., demographic information, geographic location, etc.) from the Smart TV device 115 in the example Smart TV database 175. The example database interface 205 obtains the panel data, return path data, and Smart TV data from the example panel database 155, the example RPD database 165, and the example Smart TV database 175, respectively. In some examples, the panel data, the return path data, and the Smart TV data are referred to as program tuning data of households.

At block 1510, the example database interface 205 obtains reference advertisement data. In some examples, the example addressable ad data collector 180 determines the reference advertisement data. The example addressable ad data collector 180 collects the addressable advertisement data from the example addressable ad provider 130 for monitoring addressable advertisement exposure associated with media devices in target households. The addressable ad data collector 180 stores the addressable advertisement data as reference advertisement data along with additional household information (e.g., demographic information, geographic location, etc.) for the household selected by the addressable ad provider 130 in the example addressable ad database 185. The database interface 205 obtains the reference advertisement data from the example addressable ad database 185. At block 1515, the example database interface 205 combines panel data, RPD data, Smart TV data, and reference advertisement data. The database interface 205 combines the panel data, the return path data, the Smart TV data, and the reference advertisement data. The database interface 205 analyzes the combined panel data, the return path data, the Smart TV data, and the reference advertisement data by identifying data associated with advertisement exposure (linear advertisements and addressable advertisements), removing duplicate data, etc.

At block 1520, the example advertisement determiner 210 identifies respondents that received addressable ad and respondents that receive linear ad. In examples disclosed herein, a respondent may include a household, an individual person, an individual media device, etc. The advertisement determiner 210 identifies the respondents that received addressable advertisements and the respondents that receive linear advertisements from the combined program tuning data and the reference advertisement data from the example database interface 205.

At block 1525, the example ad duration calculator 215 calculates ad durations at the respondent-level. The ad duration calculator 215 calculates the advertisement durations for linear advertisements and for addressable advertisements. In some examples, the ad duration calculator 215 determines the durations of a linear advertisement and an addressable advertisement in seconds for each minute in a telecast. For example, during one minute of a telecast, the ad duration calculator 215 determines that a linear advertisement was presented for 45 seconds during the minute and an addressable advertisement was presented for 15 seconds during the minute.

At block 1530, the example duration weighted impressions calculator 220 calculates duration weighted impressions at respondent-level. The duration weighted impressions calculator 220 calculates duration weighted impressions at the respondent-level based on the durations of linear advertisements and the durations of addressable advertisements calculated by the ad duration calculator 215. The duration weighted impressions calculator 220 calculates the duration weighted impressions for the respondents. In examples disclosed herein impressions are the sums of weights of individual respondents that viewed the advertisements during a given minute. The duration weighted impressions calculator 220 calculates the duration weighted impressions for the linear advertisements and addressable advertisements using Equations 1a and 1b, as described above in connection with FIG. 2. In examples disclosed herein, the duration weighted impressions account for weight values associated with each respondent and the durations of the linear advertisements and addressable advertisements calculated by the ad duration calculator 215.

At block 1535, the example minute-level aggregator 225 aggregates the duration weighted impressions to the minute-level. The minute-level aggregator 225 aggregates the duration weighted impressions for linear advertisements and addressable advertisements for the respondents for each commercial minute in the telecast. The minute-level aggregator 225 sums the duration weighted impressions for each commercial minute using the Equations 2a and 2b, as described above in connection with FIG. 2. The minute-level aggregator 225 determines the total commercial duration for the telecast in seconds (e.g., across all commercial minutes). The minute-level aggregator 225 determines the minute-level impressions across the telecast for both the linear advertisements and the addressable advertisements by dividing the resulting total duration weighted impressions from Equations 2a, 2b above by the total commercial duration for the telecast.

At block 1540, the example commercial minute ratings calculator 230 calculates the average commercial minute ratings. The commercial minute ratings calculator 230 calculates the average commercial minute ratings based on the minute-level duration weighted impressions from the example minute-level aggregator 225. The commercial minute ratings calculator 230 calculates the average commercial minute rating for the addressable advertisement and the average commercial minute rating for the linear advertisement using the first total impressions of the addressable advertisement, the second total impressions of the linear advertisement, and a total number of commercial seconds from the example minute-level aggregator 225. The example commercial minute ratings calculator 230 may calculate the average commercial minute ratings using Equations 3a and 3b, as described above in connection with FIG. 2. The commercial minute ratings calculator 230 determines the average commercial minutes while accounting for different advertisement durations at the respondent-level to depict changes in an audience for linear advertisements and addressable advertisements in a telecast.

At block 1545, the example communication interface 235 transmits the average commercial minute ratings. The communication interface 235 transmits the average commercial minute ratings from the commercial minute ratings calculator 230 to the example ad ratings determiner 195 of FIG. 1. The example communication interface 235 transmits the average commercial minute ratings for the linear advertisements and addressable advertisements for the ad ratings determiner 195 to credit the addressable advertisement and the linear advertisement with audience viewership metrics. In some examples, the ad ratings determiner 195 can use the ratings data to select addressable advertisements for respondents, modify the linear advertisements and addressable advertisements, disable addressable advertisements for target respondents, etc. In some examples, the ad ratings determiner 195 generates a report including data metrics regarding media exposure events for advertisements during a telecast that may be presented to media providers and advertisers. After block 1545, the program 1500 ends.

Figure 16:
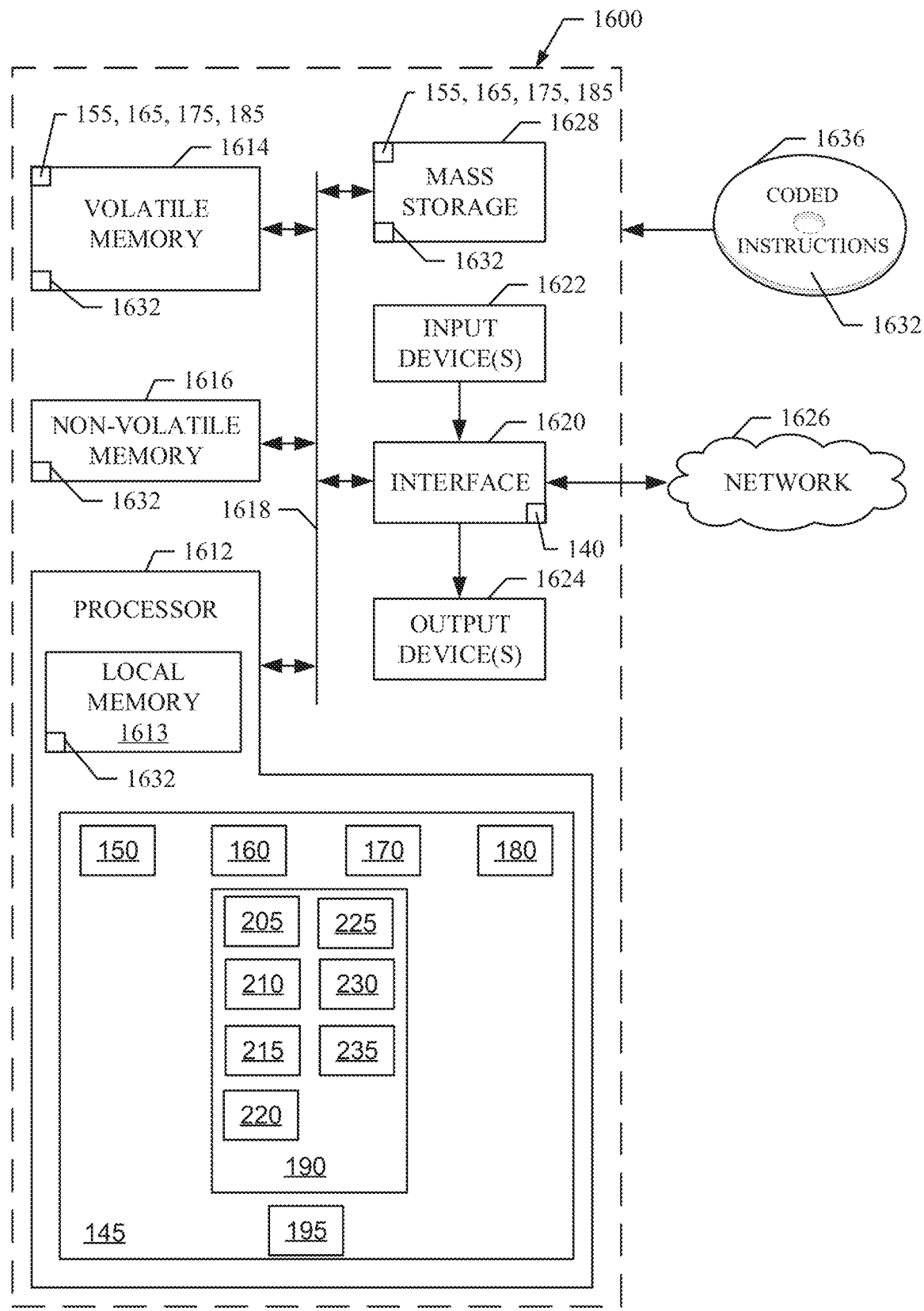
FIG. 16 is a block diagram of an example processing platform structured to execute the instructions of FIG. 15 to implement the C3-C7 calculator of FIGS. 1 and 2.

FIG. 16 is a block diagram of an example processor platform 1600 structured to execute the instructions of FIG. 15 to implement the example data center 145 and/or the example C3-C7 calculator 190 of FIGS. 1 and 2. The processor platform 1600 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example meter data analyzer 150, the example RPD collector 160, the example Smart TV data collector 170, the example addressable ad data collector 180, the example ad ratings determiner 195, the example database interface 205, the example advertisement determiner 210, the example ad duration calculator 215, the example duration weighted impressions calculator 220, the example minute-level aggregator 225, the example commercial minute ratings calculator 230, the example communication interface 235.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), a Bluetooth® interface, a near field communication (NFC) interface, and/or a PCI express interface.

In the illustrated example, one or more input devices 1622 are connected to the interface circuit 1620. The input device(s) 1622 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, redundant array of independent disks (RAID) systems, and digital versatile disk (DVD) drives.

The machine executable instructions 1632 of FIG. 15 may be stored in the mass storage device 1628, in the volatile memory 1614, in the non-volatile memory 1616, and/or on a removable non-transitory computer readable storage medium such as a CD or DVD.

From the foregoing, it will be appreciated that example methods, apparatus and articles of manufacture have been disclosed that reconcile commercial measurement ratings. The disclosed methods, apparatus and articles of manufacture improve the C3-C7 metric for average commercial minutes to differentiate ratings for linear advertisements and addressable advertisements. The disclosed methods, apparatus and articles of manufacture collect program viewership data from household devices and Smart TVs and return path data from service providers to identify what advertisement devices were served. The disclosed methods, apparatus and articles of manufacture also obtain reference data from advertisers that indicate which devices were served the linear advertisement during a time for that program broadcast, and which devices were served an addressable advertisement during that same time in the program broadcast. The disclosed methods, apparatus and articles of manufacture use both the program viewership data collected and the reference advertisement data as inputs to the modified C3-C7 metric. The disclosed methods, apparatus and articles of manufacture weight ACM measurements from individual devices to determine the C3-C7 metrics for a program such that the C3-C7 distinguish between linear advertisements and addressable advertisements.

Example methods, apparatus, systems, and articles of manufacture to reconcile commercial measurement ratings are disclosed herein. Further examples and combinations thereof include the following:

Example 1 includes an apparatus comprising an advertisement determiner to identify a first plurality of respondents that received an addressable advertisement and a second plurality of respondents that received a linear advertisement based on combined program tuning data and reference advertisement data, a calculator to calculate a first average commercial minute rating for the addressable advertisement based on first duration weighted impressions associated with the first plurality of respondents and a second average commercial minute rating for the linear advertisement based on second duration weighted impressions associated with the second plurality of respondents, and a communication interface to transmit the first average commercial minute rating and the second average commercial minute rating for crediting the addressable advertisement and the linear advertisement with audience viewership metrics.

Example 2 includes the apparatus of example 1, wherein a respondent is a household or an individual person.

Example 3 includes the apparatus of example 1, wherein the program tuning data includes at least panel data collected from media devices, return path data collected from service providers, and smart TV data collected from smart television devices.

Example 4 includes the apparatus of example 1, wherein the calculator is a first calculator, and further including a second calculator to calculate the first duration weighted impressions for the first plurality of respondents and the second duration weighted impressions the second plurality of respondents, the first duration weighted impressions and the second duration weighted impressions to account for weight values associated with each respondent included in the first plurality of respondents and the second plurality of respondents.

Example 5 includes the apparatus of example 4, further including a third calculator to calculate a first duration associated with the linear advertisement and a second duration associated with the addressable advertisement.

Example 6 includes the apparatus of example 5, wherein the second calculator is to calculate the first duration weighted impressions for the first plurality of respondents and the second duration weighted impressions for the second plurality of respondents based on the first duration associated with the linear advertisement and the second duration associated with the addressable advertisement.

Example 7 includes the apparatus of example 1, further including an aggregator to aggregate the first duration weighted impressions for the first plurality of respondents and aggregate the second duration weighted impressions for the second plurality of respondents for each commercial minute.

Example 8 includes the apparatus of example 7, wherein the calculator is to calculate a first total impressions of the addressable advertisement based on a sum of the first duration weighted impressions for the first plurality of respondents, and a second total impressions of the linear advertisement based on a sum of the second duration weighted impressions for the second plurality of respondents.

Example 9 includes the apparatus of example 8, wherein the calculator is to calculate the first average commercial minute rating for the addressable advertisement and the second average commercial minute rating for the linear advertisement based on the first total impressions of the addressable advertisement, the second total impressions of the linear advertisement, and a total number of commercial seconds.

Example 10 includes the apparatus of example 9, wherein the total number of commercial seconds is a sum of a first duration associated with the linear advertisement and a second duration associated with the addressable advertisement.

Example 11 includes At least one non-transitory computer readable medium comprising instructions which, when executed, cause at least one processor to at least identify a first plurality of respondents that received an addressable advertisement and a second plurality of respondents that received a linear advertisement based on combined program tuning data and reference advertisement data, calculate a first average commercial minute rating for the addressable advertisement based on first duration weighted impressions associated with the first plurality of respondents and a second average commercial minute rating for the linear advertisement based on second duration weighted impressions associated with the second plurality of respondents, and transmit the first average commercial minute rating and the second average commercial minute rating for crediting the addressable advertisement and the linear advertisement with audience viewership metrics.

Example 12 includes the at least one non-transitory computer readable medium of example 11, wherein a respondent is a household or an individual person.

Example 13 includes the at least one non-transitory computer readable medium of example 11, wherein the program tuning data includes at least panel data collected from media devices, return path data collected from service providers, and smart TV data collected from smart television devices.

Example 14 includes the at least one non-transitory computer readable medium of example 11, wherein the instructions cause the at least one processor to calculate the first duration weighted impressions for the first plurality of respondents and second duration weighted impressions for the second plurality of respondents, the first duration weighted impressions and the second duration weighted impressions to account for weight values associated with each respondent included in the first plurality of respondents and the second plurality of respondents.

Example 15 includes the at least one non-transitory computer readable medium of example 14, wherein the instructions cause the at least one processor to calculate a first duration associated with the linear advertisement and a second duration associated with the addressable advertisement.

Example 16 includes the at least one non-transitory computer readable medium of example 15, wherein the instructions cause the at least one processor to calculate the first duration weighted impressions for the first plurality of respondents and the second duration weighted impressions for the second plurality of respondents based on the first duration associated with the linear advertisement and the second duration associated with the addressable advertisement.

Example 17 includes the at least one non-transitory computer readable medium of example 11, wherein the instructions cause the at least one processor to aggregate the first duration weighted impressions for the first plurality of respondents and aggregate the second duration weighted impressions for the second plurality of respondents for each commercial minute.

Example 18 includes the at least one non-transitory computer readable medium of example 17, wherein the instructions cause the at least one processor to calculate a first total impressions of the addressable advertisement based on a sum of the first duration weighted impressions for the first plurality of respondents, and a second total impressions of the linear advertisement based on a sum of the second duration weighted impressions for the second plurality of respondents.

Example 19 includes the at least one non-transitory computer readable medium of example 18, wherein the instructions cause the at least one processor to calculate the first average commercial minute rating for the addressable advertisement and the second average commercial minute rating for the linear advertisement based on the first total impressions of the addressable advertisement, the second total impressions of the linear advertisement, and a total number of commercial seconds.

Example 20 includes the at least one non-transitory computer readable medium of example 19, wherein the total number of commercial seconds is a sum of a first duration associated with the linear advertisement and a second duration associated with the addressable advertisement.

Example 21 includes a method comprising identifying a first plurality of respondents that received an addressable advertisement and a second plurality of respondents that received a linear advertisement based on combined program tuning data and reference advertisement data, calculating, by executing an instruction with at least one processor, a first average commercial minute rating for the addressable advertisement based on first duration weighted impressions associated with the first plurality of respondents and a second average commercial minute rating for the linear advertisement based on second duration weighted impressions associated with the second plurality of respondents, and transmitting the first average commercial minute rating and the second average commercial minute rating for crediting the addressable advertisement and the linear advertisement with audience viewership metrics.

Example 22 includes the method of example 21, wherein a respondent is a household or an individual person.

Example 23 includes the method of example 21, wherein the program tuning data includes at least panel data collected from media devices, return path data collected from service providers, and smart TV data collected from smart television devices.

Example 24 includes the method of example 21, further including calculating the first duration weighted impressions for the first plurality of respondents and the second duration weighted impressions for the second plurality of respondents, the first duration weighted impressions and the second duration weighted impressions to account for weight values associated with each respondent included in the first plurality of respondents and the second plurality of respondents.

Example 25 includes the method of example 24, further including calculating a first duration associated with the linear advertisement and a second duration associated with the addressable advertisement.

Example 26 includes the method of example 25, further including calculating the first duration weighted impressions for the first plurality of respondents and the second duration weighted impressions for the second plurality of respondents based on the first duration associated with the linear advertisement and the second duration associated with the addressable advertisement.

Example 27 includes the method of example 21, further including aggregating the first duration weighted impressions for the first plurality of respondents and aggregate the second duration weighted impressions for the second plurality of respondents for each commercial minute.

Example 28 includes the method of example 27, further including calculating a first total impressions of the addressable advertisement based on a sum of the first duration weighted impressions for the first plurality of respondents, and a second total impressions of the linear advertisement based on a sum of the second duration weighted impressions for the second plurality of respondents.

Example 29 includes the method of example 28, further including calculating the first average commercial minute rating for the addressable advertisement and the second average commercial minute rating for the linear advertisement based on the first total impressions of the addressable advertisement, the second total impressions of the linear advertisement, and a total number of commercial seconds.

Example 30 includes the method of example 29, wherein the total number of commercial seconds is a sum of a first duration associated with the linear advertisement and a second duration associated with the addressable advertisement.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   interface circuitry;
   computer readable instructions; and
   programmable circuitry to at least one of execute or instantiate the computer readable instructions to:
   communicate with one or more meters and one or more media devices to obtain combined program tuning data associated with a plurality of media devices, the plurality of media devices including the one or more media devices;
   communicate with an addressable advertisement provider to obtain reference advertisement data associated with addressable advertisements provided to the one or more media devices;
   identify a first plurality of respondents that received an addressable advertisement during a commercial time period of a media program on ones of the plurality of media devices targeted by the addressable advertisement based on the combined program tuning data and reference advertisement data, the ones of the plurality of media devices associated with ones of the first plurality of respondents;
   identify a second plurality of respondents that received a linear advertisement during the commercial time period of the media program based on the combined program tuning data and the reference advertisement data, the linear advertisement broadcast with the media program and not targeted to a particular one of the plurality of media devices;
   calculate a first average commercial minute rating for addressable advertisements during the media program based on first duration weighted impressions associated with the first plurality of respondents;
   calculate a second average commercial minute rating for linear advertisements during the media program based on second duration weighted impressions associated with the second plurality of respondents;
   disable addressable advertisement delivery for one or more respondents based on the first average commercial minute rating and the second average commercial minute rating; and
   transmit, via an electronic communication network, the first average commercial minute rating and the second average commercial minute rating to a computer database, the first average commercial minute rating and the second average commercial minute rating to adjust a computer-calculated average commercial rating metric to differentiate crediting between the addressable advertisement and the linear advertisement.

2. The apparatus of claim 1, wherein a respondent is a household or an individual person.

3. The apparatus of claim 1, wherein the combined program tuning data includes at least panel data collected from media devices, return path data collected from service providers, and smart television data collected from smart television devices.

4. The apparatus of claim 1, wherein the programmable circuitry is to calculate the first duration weighted impressions for the first plurality of respondents and the second duration weighted impressions the second plurality of respondents, the first duration weighted impressions and the second duration weighted impressions to account for weight values associated with each respondent included in the first plurality of respondents and the second plurality of respondents.

5. The apparatus of claim 4, wherein the programmable circuitry to calculate a first duration associated with the linear advertisement and a second duration associated with the addressable advertisement.

6. The apparatus of claim 5, wherein the programmable circuitry is to calculate the first duration weighted impressions for the first plurality of respondents and the second duration weighted impressions for the second plurality of respondents based on the first duration associated with the linear advertisement and the second duration associated with the addressable advertisement.

7. The apparatus of claim 1, wherein the programmable circuitry is to aggregate the first duration weighted impressions for the first plurality of respondents and aggregate the second duration weighted impressions for the second plurality of respondents for each commercial minute.

8. The apparatus of claim 7, wherein the programmable circuitry is to calculate a first total impressions of the addressable advertisement based on a sum of the first duration weighted impressions for the first plurality of respondents, and a second total impressions of the linear advertisement based on a sum of the second duration weighted impressions for the second plurality of respondents.

9. The apparatus of claim 8, wherein the programmable circuitry is to calculate the first average commercial minute rating for the addressable advertisement and the second average commercial minute rating for the linear advertisement based on the first total impressions of the addressable advertisement, the second total impressions of the linear advertisement, and a total number of commercial seconds.

10. The apparatus of claim 9, wherein the total number of commercial seconds is a sum of a first duration associated with the linear advertisement and a second duration associated with the addressable advertisement.

11. At least one non-transitory computer readable medium comprising instructions which, when executed, cause at least one processor to at least:
communicate with one or more meters and one or more media devices to obtain combined program tuning data associated with a plurality of media devices, the plurality of media devices including the one or more media devices;
communicate with an addressable advertisement provider to obtain reference advertisement data associated with addressable advertisements provided to the one or more media devices;
identify a first plurality of respondents that received an addressable advertisement during a commercial time period of a media program on ones of the plurality of media devices targeted by the addressable advertisement based on the combined program tuning data and reference advertisement data, the ones of the plurality of media devices associated with ones of the first plurality of respondents;
identify a second plurality of respondents that received a linear advertisement during the commercial time period of the media program based on the combined program tuning data and the reference advertisement data, the linear advertisement broadcast with the media program and not targeted to a particular one of the plurality of media devices;
calculate a first average commercial minute rating for addressable advertisements during the media program based on first duration weighted impressions associated with the first plurality of respondents;
calculate a second average commercial minute rating for linear advertisements during the media program based on second duration weighted impressions associated with the second plurality of respondents;
disable addressable advertisement delivery for one or more respondents based on the first average commercial minute rating and the second average commercial minute rating; and
transmit, via an electronic communication network, the first average commercial minute rating and the second average commercial minute rating to a computer database, the first average commercial minute rating and the second average commercial minute rating to adjust a computer-calculated average commercial rating metric to differentiate crediting between the addressable advertisement and the linear advertisement.

12. The at least one non-transitory computer readable medium of claim 11, wherein the instructions cause the at least one processor to calculate the first duration weighted impressions for the first plurality of respondents and second duration weighted impressions for the second plurality of respondents, the first duration weighted impressions and the second duration weighted impressions to account for weight values associated with each respondent included in the first plurality of respondents and the second plurality of respondents.

13. The at least one non-transitory computer readable medium of claim 12, wherein the instructions cause the at least one processor to calculate a first duration associated with the linear advertisement and a second duration associated with the addressable advertisement.

14. The at least one non-transitory computer readable medium of claim 13, wherein the instructions cause the at least one processor to calculate the first duration weighted impressions for the first plurality of respondents and the second duration weighted impressions for the second plurality of respondents based on the first duration associated with the linear advertisement and the second duration associated with the addressable advertisement.

15. The at least one non-transitory computer readable medium of claim 11, wherein the instructions cause the at least one processor to aggregate the first duration weighted impressions for the first plurality of respondents and aggregate the second duration weighted impressions for the second plurality of respondents for each commercial minute.

16. The at least one non-transitory computer readable medium of claim 15, wherein the instructions cause the at least one processor to calculate a first total impressions of the addressable advertisement based on a sum of the first duration weighted impressions for the first plurality of respondents, and a second total impressions of the linear advertisement based on a sum of the second duration weighted impressions for the second plurality of respondents.

17. The at least one non-transitory computer readable medium of claim 16, wherein the instructions cause the at least one processor to calculate the first average commercial minute rating for the addressable advertisement and the second average commercial minute rating for the linear advertisement based on the first total impressions of the addressable advertisement, the second total impressions of the linear advertisement, and a total number of commercial seconds.

18. The at least one non-transitory computer readable medium of claim 17, wherein the total number of commercial seconds is a sum of a first duration associated with the linear advertisement and a second duration associated with the addressable advertisement.

19. A method comprising:
communicating with one or more meters and one or more media devices to obtain combined program tuning data associated with a plurality of media devices, the plurality of media devices including the one or more media devices;
communicating with an addressable advertisement provider to obtain reference advertisement data associated with addressable advertisements provided to the one or more media devices;
identifying a first plurality of respondents that received an addressable advertisement during a commercial time period of a media program on ones of the plurality of media devices targeted by the addressable advertisement based on the combined program tuning data and reference advertisement data, the ones of the plurality of media devices associated with ones of the first plurality of respondents;
identifying a second plurality of respondents that received a linear advertisement during the commercial time period of the media program based on the combined program tuning data and the reference advertisement data, the linear advertisement broadcast with the media program and not targeted to a particular one of the plurality of media devices;
calculating a first average commercial minute rating for addressable advertisements during the media program based on first duration weighted impressions associated with the first plurality of respondents,
calculating a second average commercial minute rating for linear advertisements during the media program based on second duration weighted impressions associated with the second plurality of respondents;
disabling addressable advertisement delivery for one or more respondents based on the first average commercial minute rating and the second average commercial minute rating; and
transmitting, via an electronic communication network, the first average commercial minute rating and the second average commercial minute rating to a computer database, the first average commercial minute rating and the second average commercial minute rating to adjust a computer-calculated average commercial rating metric to differentiate crediting between the addressable advertisement and the linear advertisement.

20. The method of claim 19, wherein the combined program tuning data includes at least panel data collected from media devices, return path data collected from service providers, and smart TV data collected from smart television devices.

* * * * *